(12) United States Patent
Song et al.

(10) Patent No.: US 10,394,244 B2
(45) Date of Patent: Aug. 27, 2019

(54) METHOD FOR CONTROLLING MOBILE ROBOT BASED ON BAYESIAN NETWORK LEARNING

(71) Applicant: KOREA UNIVERSITY RESEARCH AND BUSINESS FOUNDATION, Seoul (KR)

(72) Inventors: Jae Bok Song, Seoul (KR); Min Kuk Jung, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 15/606,393

(22) Filed: May 26, 2017

(65) Prior Publication Data
US 2017/0344007 A1 Nov. 30, 2017

(30) Foreign Application Priority Data

May 26, 2016 (KR) .................. 10-2016-0064493
Oct. 31, 2016 (KR) .................. 10-2016-0143822

(51) Int. Cl.
*G05D 1/00* (2006.01)
*G06N 7/00* (2006.01)
*G05D 1/02* (2006.01)
*G01C 21/00* (2006.01)
*G01C 21/20* (2006.01)
*G06N 3/00* (2006.01)

(52) U.S. Cl.
CPC .......... *G05D 1/0217* (2013.01); *G01C 21/00* (2013.01); *G01C 21/005* (2013.01); *G01C 21/206* (2013.01); *G05D 1/0274* (2013.01); *G06N 3/008* (2013.01); *G06N 7/005* (2013.01); *Y10S 901/01* (2013.01)

(58) Field of Classification Search
CPC .. G05D 1/0217; G05D 1/0274; G01C 21/206; G01C 21/005; G01C 21/00; G06N 7/005; G06N 3/008; Y10S 901/01
USPC ......................................................... 701/26
See application file for complete search history.

(56) References Cited

FOREIGN PATENT DOCUMENTS

EP 2659320 A2 * 11/2013 ............. B25J 19/02

* cited by examiner

*Primary Examiner* — Brian P Sweeney
(74) *Attorney, Agent, or Firm* — Rabin & Berdo, P.C.

(57) ABSTRACT

The present invention provides a safe path planning method including a process of using a grid map and a congestion map, and a process of planning a path of a mobile robot using a cost function.

11 Claims, 25 Drawing Sheets

| $A_{t-2}$ | $B_{t-2}$ | $A_{t-1}$ | $B_{t-1}$ |
|---|---|---|---|
| $\frac{2}{10}$ | $\frac{7}{10}$ | $\frac{2}{10}$ | $\frac{6}{10}$ |

FIG. 7

| $A_{t-2}$ | $B_{t-2}$ | $B_{t-1}$ | |
|---|---|---|---|
| | | 0 | 1 |
| 0 | 0 | $\frac{2}{5}$ | $\frac{3}{5}$ |
| 0 | 1 | $\frac{2}{5}$ | $\frac{3}{5}$ |
| 1 | 0 | $\frac{2}{5}$ | $\frac{3}{5}$ |
| 1 | 1 | $\frac{2}{5}$ | $\frac{3}{5}$ |

FIG. 8

| $A_{t-2}$ | $B_{t-2}$ | $A_{t-1}$ | |
|---|---|---|---|
| | | 0 | 1 |
| 0 | 0 | $\frac{4}{5}$ | $\frac{1}{5}$ |
| 0 | 1 | $\frac{4}{5}$ | $\frac{1}{5}$ |
| 1 | 0 | $\frac{4}{5}$ | $\frac{1}{5}$ |
| 1 | 1 | $\frac{4}{5}$ | $\frac{1}{5}$ |

<Congestion map>    <Congestion cost>

(a)

(b)

METHOD FOR CONTROLLING MOBILE ROBOT BASED ON BAYESIAN NETWORK LEARNING

CROSS-REFERENCE TO RELATED APPLICATIONS

This application claims the benefit of Korean Patent Application No. 10-2016-0064493, filed on May 26, 2016 and No. 10-2016-0143822, filed on Oct. 31, 2016 in the Korean Intellectual Property Office, which is incorporated herein by reference in its entirety.

1. Field of the Invention

The present invention relates to a mobile robot that executes an intelligent path planning method which prevents collision with a sudden obstacle that may appear in an actual environment and does not cause an inconvenience in a human's walking, and a control method thereof.

2. Description of Related Art

In general, a service robot is a robot developed for the purpose of guide, transportation, assistance of the work, etc., and is mainly used widely in an indoor environment. A general indoor environment is a space where people live and move. A robot has many difficulties in co-existing with humans and doing activities together with the humans in a limited space, and thus path planning considering an actual environment is necessary to cope with the difficulties. Such a path planning method reduces an unexpected collision between a robot and a moving obstacle, thus contributing to a stable movement of the robot.

In addition, the path planning method can be performed in a similar manner as a human's way of thinking to improve an efficiency of the moment. For example, a human plans a variety of paths to reach a desired destination point by car. The human selects a path whose traffic volume is the smallest based on various preset information obtained through various media, but not a path whose distance is merely the shortest, so that the human can arrive at the desired destination point more rapidly and safely even though the movement distance is somewhat increased.

However, conventional path planning methods entail a problem in that they are mostly focused only on the movement at the shortest distance from a current position to a destination point, and thus stability or efficiency is not taken into consideration during the movement along a created path. In the case where a robot is applied to a real life where the robot co-exists with a human, several problems may occur and a user who is provided with a map guide to the destination using this technology may also suffer from an inconvenience of having to passing through a place crowded with people.

Spaces where people frequently move or areas where a sudden obstacle may appear exist in large numbers in an actual environment. If a robot merely moves along the shortest path from the current position to the destination point without considering the above-mentioned environmental characteristics, there is a high possibility that the robot will collide with a human or a moving obstacle. Further, the navigation of a robot that does not take the human into consideration may cause an inconvenience in the human's walking.

SUMMARY OF THE INVENTION

Accordingly, the present invention has been made to solve the above-mentioned problems occurring in the prior art, and it is an object of the present invention to develop a path planning method in which a mobile robot previously detours around an area where a number of moving obstacles appear to create a safe path from a current position to a destination point, and to provide a mobile robot that implement the path planning method and a control method thereof.

In other words, the present invention is directed to a mobile robot that performs a safe path planning method considering a human activity area in an environment where the robot and the human co-exists together, and a control method thereof. A conventional path planning technique is mostly focused merely on a shortest path creation-based technique without considering the human's activities. However, a path created by such a technique cannot prevent a collision with an obstacle, thus making it impossible to ensure the safety of the robot. The present invention can create a path that detours around an area where a human activity is performed or an area where a sudden obstacle appears to reduce a possibility that the robot will encounter an obstacle, and can reduce an obstacle-avoiding movement to enable an efficient and safe navigation of the robot. In addition, the present invention can create information regarding a dangerous area such as a door or a facility corner through previous learning to reduce a possibility that the robot will collide with an obstacle. By doing so, the robot can pass through an obstacle-free area at a higher speed even without frequently changing its movement direction to avoid a sudden obstacle. This method enables the robot to reach a destination point within a shorter time, such as the case where a method in which the robot moves while detouring around an area having a less traffic volume is actually a method in which the robot reaches the destination point more rapidly. Therefore, it is required that the robot should learn the movement paths of people and the environments that are changed in real-time in an environment where the robot and the human co-exist together, and create a path that detours the movement paths and the like. For example, the robot generates a path that detours around a specific area packed with people in an environment such as a shopping mall or a park with a large space so that a user or the robot can move a more efficient and safe path.

The present invention proposes an intelligent path planning method for a mobile robot, which prevents collision with a sudden obstacle that may appear in an actual environment and does not cause an inconvenience in a human's walking, and provides a mobile robot that implements the intelligent path planning method and a control method thereof.

To this end, in the present invention, a change of a real-time environment is detected and stored, and is utilized in the creation of the path planning. The created path can induce the robot to detour around a place where an obstacle frequently appears or a dead zone where a sudden obstacle may appear and to safely reach a destination point.

A process of drafting information regarding an environment includes a step of building a grid map and a step of building an obstacle map, and a congestion map is built by utilizing the obstacle map or information regarding the obstacle map. The grid map is a map that includes basic spatial information for creation of a path, and the obstacle map is a map that is built based on sensing information obtained through sensing unit while a robot or a user moves in an environment.

The obstacle map obtained through learning is graphed by a Bayesian network technique, and the congestion map is built based thereon. The built congestion map and the grid map can be merged to build a map reflecting a real-time environment so that a more efficient and safe path can be created by using this map.

In other words, in one aspect, the present invention provides a method for controlling the navigation of the mobile robot, in which a control unit applies a drive control signal to a robot driving unit to control the navigation of the mobile robot using sensing information of a sensing unit and preset data that is stored in a storage unit and includes grid information for a navigation environment, the method including: a path planning step S10 of calculating a navigation path of the mobile robot from a departure point to a destination point based on congestion map information calculated using grid map information for a navigation environment included in the preset data and the sensing information; a navigation step S20 of acquiring navigation environmental information including obstacle map information using the sensing information sensed by the sensing unit 10 in a process in which the mobile robot moves along the navigation path calculated in the path planning step S10, and allowing the mobile robot to navigate from the departure point to the destination point by performing a position estimation operation using the acquired navigation environmental information; and a congestion map building and calculating step S30 of building a congestion map for the navigation environment using a navigation environment database having stored therein navigation cost information including information regarding a probability of existence or absence of an obstacle in a relevant grid in the navigation environmental information acquired in the navigation step after the completion of the navigation step S20.

In the method of controlling the navigation of the mobile robot, the navigation cost information included in the navigation environment database may include: intrinsic cost information stored by converting information regarding a static obstacle that is fixed in position in the navigation environment with respect to each grid included in the grid information, into a cost; congestion cost information stored by converting information regarding a dynamic obstacle that can move in the navigation environment with respect to each grid included in the grid information, into a cost; and adjacency cost information stored by assigning an adjacency cost to the number of grids on a minimum movement path from a departure point to a destination point if the departure point and the destination point are set.

In the method of controlling the navigation of the mobile robot, the path planning step S10 may include: a navigation cost calculation step S11 of allowing the arithmetic unit 40 to perform an arithmetic operation on the navigation cost information from the departure point to the destination point in response to an arithmetic control signal from the control unit 20 to calculate a navigation cost; and a navigation path calculation step S13 of calculating a navigation path from the departure point to the destination point using a path calculation method in which the navigation cost calculated in the navigation cost calculation step S11 is previously set and stored.

In the method of controlling the navigation of the mobile robot, the navigation cost calculation step S11 may include calculating the navigation cost using the congestion cost information calculated from a Bayesian network employing Bayes' theorem based on the navigation environment database.

In the method of controlling the navigation of the mobile robot, the navigation environment database may include obstacle map information including information regarding a probability of existence or absence of an obstacle in the grid according to temporal information.

In the method of controlling the navigation of the mobile robot, the temporal information may include information regarding weekday, date and time. In addition, a unit number of the temporal information influenced by different temporal information with respect to the same grid in the Bayesian network may be set as an influence time unit number, and the preset data may include the influence time unit number.

In the method of controlling the navigation of the mobile robot, the navigation cost calculation step S11 may include: a congestion cost calculation step S110 of calculating a congestion cost using the congestion cost information for the grid, which is calculated through the Bayesian network according to the influence time unit number; an intrinsic cost calculation step S120 of calculating an intrinsic cost using the intrinsic cost information for each grid included in the grid information; an adjacency cost calculation step S130 of calculating an adjacency cost using the adjacency cost information stored by assigning an adjacency cost to the number of grids on a minimum movement path from a departure point to a destination point if the departure point and the destination point are set; and a navigation cost calculation step S140 of calculating a navigation cost using the congestion cost, the intrinsic cost and the adjacency cost, which are calculated for the grid.

In the method of controlling the navigation of the mobile robot, the path calculation method may be a minimum path gradient method, and may include the navigation path calculation step S13 of calculating the navigation path formed at a minimum cost from the departure point to the destination point using a navigation cost for each grid, which is calculated in the navigation cost calculation step.

In the method of controlling the navigation of the mobile robot, the navigation step S20 may include: a sensing step S2 of sensing information for the navigation environment through the sensing unit 10; a position estimation step S23 of allowing the control unit to estimate the current position of the mobile robot using the sensing information and the preset data; an obstacle map calculation step S25 of calculating and updating obstacle information for the navigation environment and calculating the obstacle map information using the current position of the mobile robot obtained in the position estimation step S23 and the sensing information; a movement control step S27 of allowing the control unit 20 to apply a movement control signal to a robot driving unit 63 of the mobile robot to cause the mobile robot to move to a destination point; a navigation completion confirmation step S28 of confirming whether or not the mobile robot moving through the movement control step S27 reaches the destination point; and a navigation environment database update step S29 of updating the navigation environment database using the obstacle map information if it is determined in the navigation completion confirmation step S28 that the navigation of the mobile robot has been completed.

In the method of controlling the navigation of the mobile robot, the temporal information may be information regarding date and time. The congestion map building and calculating step S30 may include: a navigation environment database selection step S31 of selecting and calculating a navigation environment selection database having information regarding a probability of existence or absence of an obstacle in the grid according to temporal information with respect to a current time and a current date from the navigation environment database using the temporal information and the influence time unit number; a Bayesian network calculation step S33 of constructing a Bayesian network and performing an arithmetic operation on the Bayesian network using the navigation environment selection database, and calculating the probability of existence or absence of an obstacle in the grid with respect to the current time and the current date; and a congestion map building step S35 of building or updating a congestion map using the probability of existence or absence of an obstacle in the grid, obtained in the Bayesian network calculation step S33.

In the method of controlling the navigation of the mobile robot, the Bayesian network calculation step S33 may include: a Bayesian network construction step S331 of constructing the Bayesian network using the navigation environment selection database; and a Bayesian network arithmetic step S333 of allowing the arithmetic unit 40 to calculate the probability of existence or absence of an obstacle in the grid with respect to the current time and the current date using the Bayesian network constructed in the Bayesian network construction step S331.

The mobile robot and the method for controlling the navigation of the mobile robot according to the embodiments of the present invention as constructed above have the following advantageous effects.

The path planning method of the present invention can be applied in every field in which a service robot is used. In general, the service robot is a robot developed for the purpose of guide, transportation, assistance of the work, etc., and is widely used in various environmental spaces. Such environments include the habitation and migration spaces of people, and thus the robot has a lot of difficulties in co-existing and doing activities with a plurality of moving objects in a limited space. On the other hand, the present invention requires a path planning method considering a real environment and a human activity to cope with this difficulties, and a path created through this path planning method ensures a more stable and efficient navigation for the robot and the mobile robot of the present invention can become a service robot that can provide an convenience to a human.

In addition, the present invention does not merely create either a local path planning method for avoiding an obstacle in real-time or the always same shortest path, but automatically changes the movement path of the robot to fit a real environment, thus always making it possible to create a path optimized for the environment.

In particular, this technology is necessary in a place requiring stability such as a hospital. Since such a place may make it difficult for people to recognize or avoid a robot, it is necessary to create a path that detours around such an area based on previously learned information.

Further, the inventive technology is expected to guide an optimal path for both a robot and a user in an area crowded with people such as an amusement park or a shopping mall in near future. In addition, the prevent invention will provide a user with a correct path to reach a desired store while avoiding an area most crowded with people.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 6 is a table showing a probability of existence of a node in the obstacle maps at each time in the situation of FIG. 5;

FIGS. 7 and 8 are tables showing the correlation of nodes between previous time and subsequent time in the situation of FIG. 5;

DESCRIPTION OF THE PREFERRED EMBODIMENTS

Hereinafter, the configuration and operation of a mobile robot and a method of controlling the navigation of the mobile robot according to the present invention will be described in detail with reference to the accompanying drawings.

The present invention provides a method of controlling the navigation of the mobile robot, in which an optimized movement path considering a time-series element is calculated using a database including a change of a dynamic obstacle besides a static obstacle to control the navigation of the mobile robot, but not a simple shortest path navigation of the mobile robot.

Figure 21:
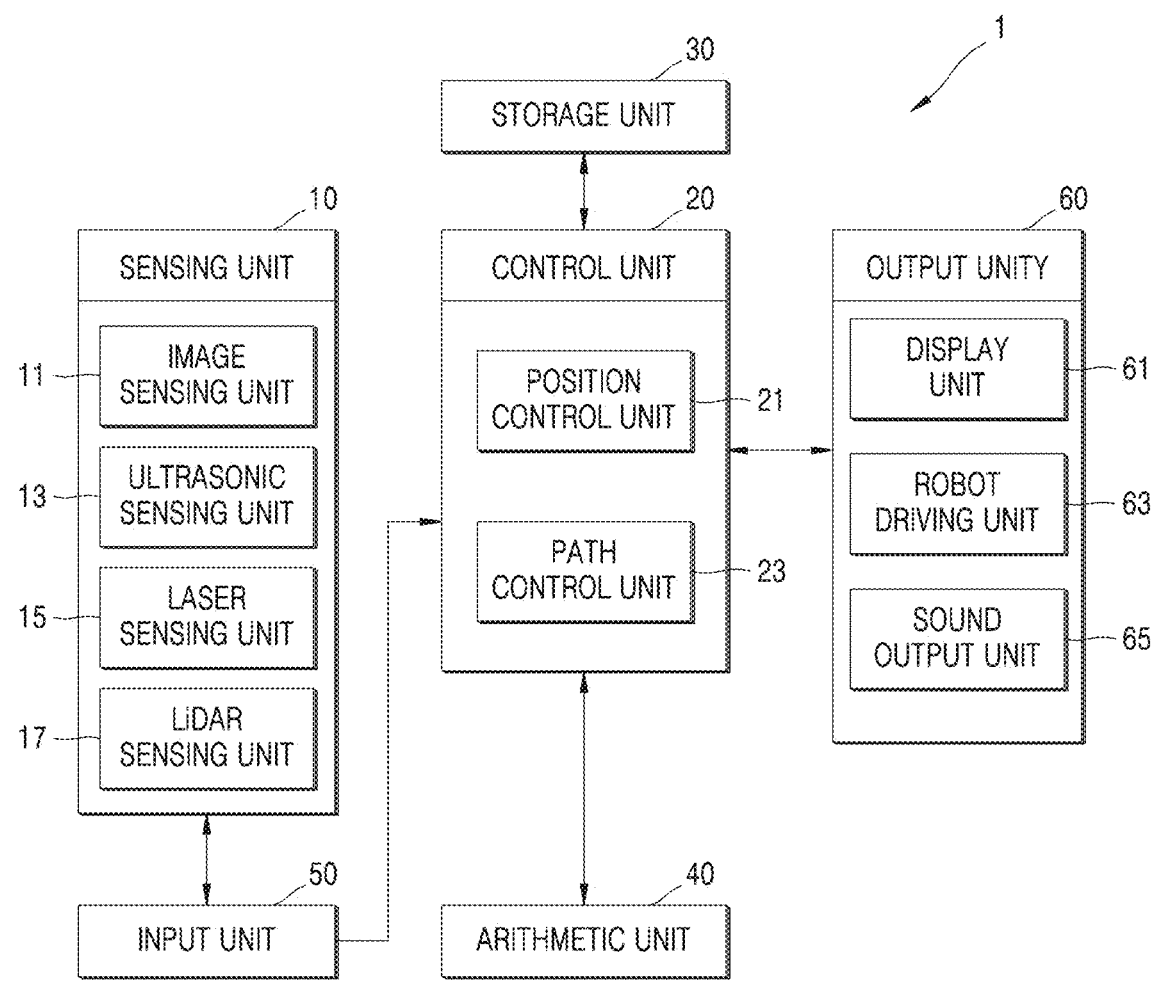
FIG. 21 is a schematic block diagram of a mobile robot of the present invention.

First, in FIG. 21, there is shown a schematic block diagram of a mobile robot 1 according to the present invention.

The mobile robot 1 includes a sensing unit 10, a control unit 20, a storage unit 30, an arithmetic unit 40, an input unit 50, and an output unit 60. The sensing unit 10 is mounted at the mobile robot and is used to sense environmental information of an external navigation environment. The sensing unit 10 includes an image sensing unit 11 such as a camera, an ultrasonic sensing unit 13 such as an ultrasonic sensor for detecting a distance between the robot and an obstacle, a laser sensing unit 15 such as a laser scanner for detecting a distance, and a LiDAR sensing unit 17 such as a three-dimensional (3D) scanner, and is operated in response to a sensing control signal from the control unit 20 to sense an external navigation environment. Various sensing devices may be used within a range of capable of acquiring navigation environment sensing information.

The storage unit 30 is connected to the control unit 20, and serves to store sensing information in response to a storage control signal from the control unit 20, or store preset data used for estimation of the position of the mobile robot or a navigation environment database which will be described later.

The arithmetic unit 40 performs a predetermined arithmetic process in response to an arithmetic control signal from the control unit 20. In this embodiment, the arithmetic unit 40 serves to perform an arithmetic calculation on a probability that an obstacle will be occupied in a grid on a grid map with respect to a current time, i.e., a current time and date or weekday and a cost value based on the probability by using a probability that an obstacle will be occupied in the grid on the grid map which will be described later with respect to times and dates or weekdays of the previous and subsequent relationship as many as a preset influence time unit number.

The input unit 50 functions to input data or preset data by a user through a mobile robot or a device for operating the mobile robot.

The output unit 60 includes a robot driving unit 63 that generates and transfers a driving force for moving the mobile robot 1, and may include a sound output unit 65 or a display unit 61 besides the robot driving unit 63.

In the meantime, the preset data that is previously stored in the storage unit 30 as described above includes grid map information, spatial information as environmental information regarding an ambient environment where the mobile robot 1 is to navigate, i.e., grid information regarding a navigation environment. As described below, the preset data includes a grid map, a congestion map, and an adjacency map with respect to a navigation environment where the mobile robot of the present invention navigates. Among them, the grid map includes environmental information regarding a static obstacle, and the congestion map using an obstacle map includes environmental information regarding a dynamic obstacle.

In other words, the grid map of the present invention is built by dividing an environment into grids having the same size, and each grid can express, as an occupancy probability ranging between 0 and 1, a possibility that a position or space will be occupied by a static obstacle, i.e., a stationary obstacle that substantially occupies a fixed position in a space, based on a Bayesian update rule. A grid occupied by a stationary obstacle is set to have an occupancy probability of 1, and a non-occupied grid is set to have an occupancy probability of 0. In addition, in the case where there is no information regarding whether or not the grid is occupied, a preset probability, for example, an occupancy probability of 0.5 may be assigned.

Figure 1:
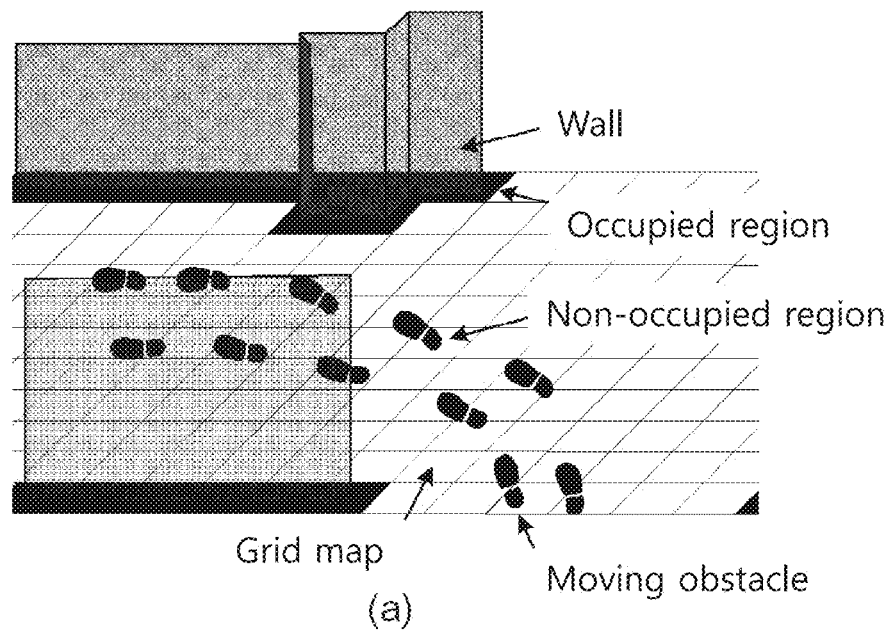
FIG. 1 is a schematic diagram showing a difference between a grid map and an obstacle map according to an environmental change.
Figure 1:
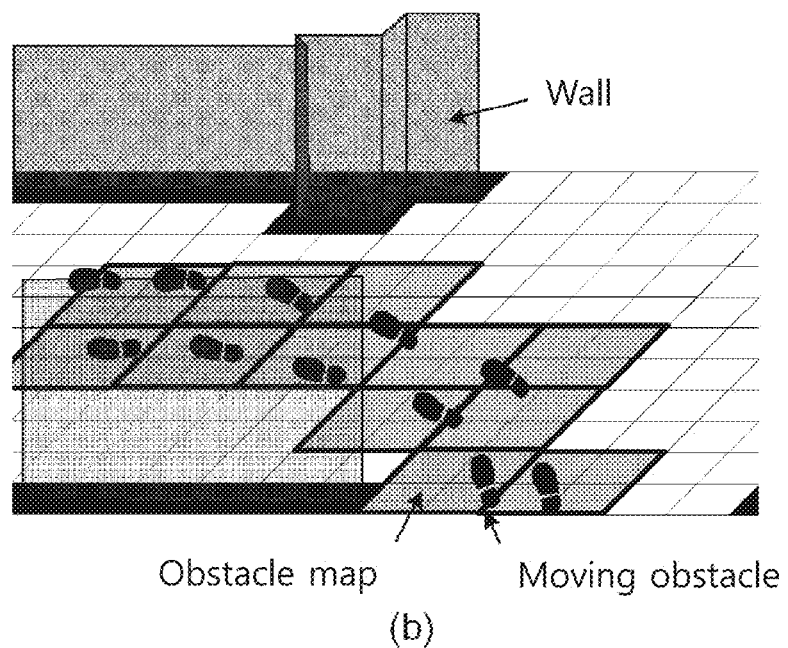

As such, the grid map is focused only on a modeling for an environment as shown in FIG. 1($a$), and thus although a space or position where a dynamic obstacle as a moving obstacle frequently moves is a grid that is frequently occupied, a region corresponding to a relevant grid is indicated as a non-occupied region because there is no a static obstacle, i.e., a stationary obstacle in the relevant grid. In the case an obstacle, i.e., a static obstacle displayed on this grid map, only a fixed obstacle such as a wall is indicated as an occupied region.

Therefore, the grid map represents only whether or not the stationary obstacle exists or occupies. For this reason, there is a restriction that reflection of information regarding an actual environment is difficult, and thus it is very difficult to create a safe path to a destination using only the grid map. In view of this, the present invention utilizes an obstacle map, i.e., an environmental map including additional ambient environmental information.

In other words, the obstacle map in the present invention is defined as a map built by converting movement information of an obstacle into spatial information. Thus, the obstacle map is focused on whether or not a dynamic obstacle, i.e., a moving obstacle indicating a moving operation passes through a specific region, and a human is also classified as the dynamic obstacle under the environmental map. As shown in FIG. 1($b$), when a moving obstacle including a human passes through a specific region, a space occupancy probability with respect to a grid corresponding to the passed region is increased.

Figure 2:
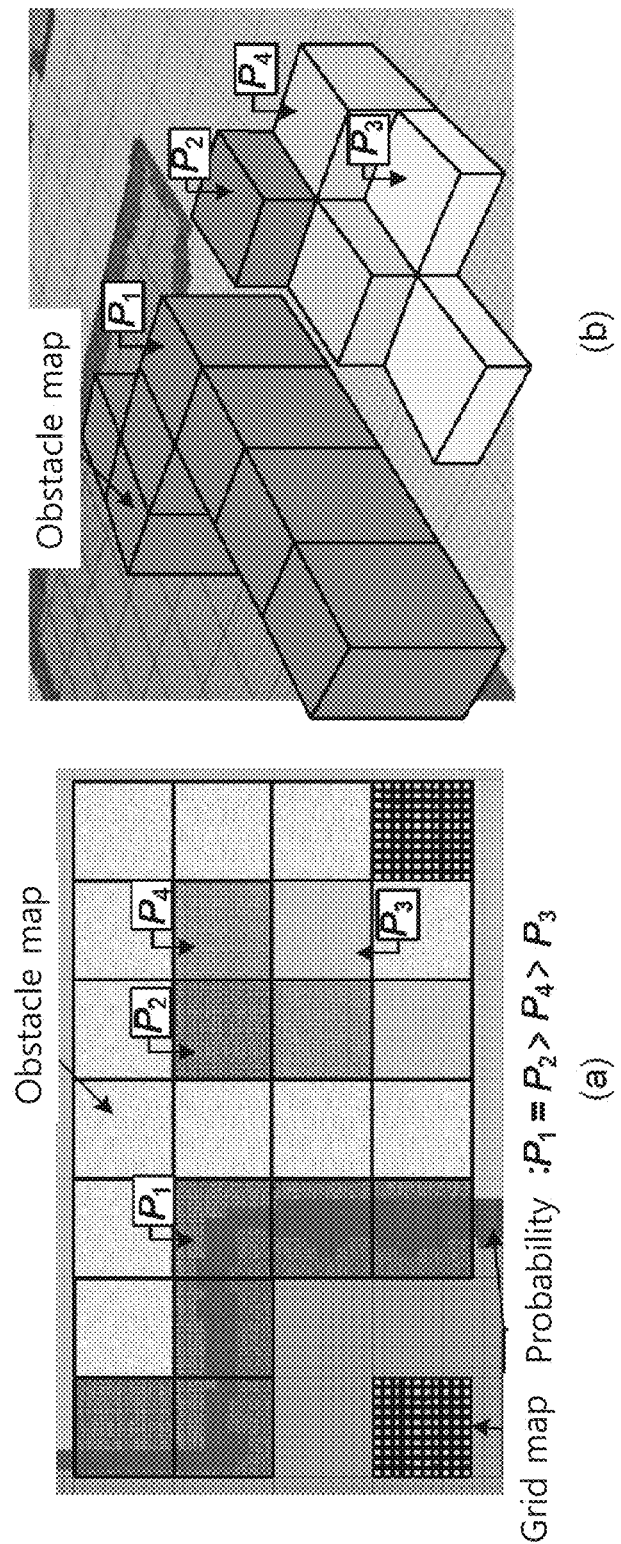
FIG. 2 is a diagram showing a relationship between a grid map and an obstacle map according to the present invention, i.e., a probability indicating grids of the obstacle map of the present invention and a difference according to the probability.

In FIG. 2, there is displayed map information where an obstacle map is overlapped on a grid map. Herein, the grids of the obstacle map have various occupancy probabilities. In addition, in the present invention, each grid of the obstacle map may be composed of multiple grids of the grid map as shown in FIG. 2. The reason for this is to represent the movement of a human or a moving obstacle using a larger grid because it is difficult to accurately represent the movement of the human or the moving obstacle as a small-sized grid of the grid map. The size of a map-dependent grid may be included in a preset data as grid information. For example, if each grid of the grid map is set to have a size of 10 cm×10 and each grid of the obstacle map is set to have a size of 100 cm×100 cm, a relationship is formed in which a grid of the obstacle map includes 100 grids on the grip map.

An occupancy probability on the obstacle map in the present invention can be represented as the height of a grid. A grid of the obstacle map including a stationary obstacle that previously exists in the grid map or a newly appearing stationary obstacle, such as $P_1$ and $P_2$ of FIG. 2 has a very high probability, and thus the representation of an occupancy probability included in a relevant grid forms a very great height. In addition, a place where a stationary obstacle does not exist but a moving obstacle frequently passes is also assigned with a high probability. For example, since a grid $P_4$ is higher than a grid $P_3$ in terms of a passing frequency of the moving obstacle, it is represented to have a higher height. An example of this environment includes an information desk where people frequently come and go, or a space in front of an elevator. A grid that does not obtain information from an environment may be set to have an occupancy probability of 0.5. In addition, the obstacle map may be built and stored in a database, i.e., a navigation environment database of the storage unit 30 by dividing each information according to date, time or weekday.

In performing a control method of the mobile robot of the present invention, the control unit 20 applies an arithmetic control signal to the arithmetic unit 40 to control the navigation of the mobile robot by planning a path of the mobile robot with respect to current time, date or the like, by the use of the sensing information, the preset data and the navigation environment database of the sensing unit 10, the input unit 50 and the storage unit 30.

In planning a navigation path of the mobile robot, the present invention uses a Bayesian network. In other words, the present invention additionally builds and utilizes a congestion map employing an obstacle map other than simple grid map information by using the Bayesian network to calculate a navigation path of minimizing an effect of a dynamic obstacle on the time-series element beyond the setting of a simple movement path through the calculation of a minimum movement path in a simple grid map.

The congestion map in the present invention means a map that is built based on the accumulated obstacle map data and predicts whether or not an obstacle exits in a relevant area. The congestion map is formed based on the obstacle map built based on sensing information obtained after allowing the sensing unit 10 to sense ambient environmental information in response to a sensing control signal from the control unit 20, so that the congestion map has a grid of the same size as that of the obstacle map. In other words, the obstacle map means a map including information regarding a dynamic obstacle sensed and built at that time then at relevant time information for a relevant grid, i.e., relevant date and time, relevant date, or relevant weekday. The congestion map means map information that is derived from current time information which it is desired to obtain depending on each influence time unit number, i.e., current time, current date and current weekday using information regarding obstacle maps with respect to relevant dates and times, relevant dates, and relevant weekdays within the range according to the influence time unit number. In the present invention, the congestion map can be built by using the Bayesian network between obstacle maps accumulated.

A general Bayesian network (GBN) is the most natural method that can represent the interdependency between nodes corresponding to individual grids, and is suitable for building the congestion map based on the obstacle map. The Bayesian network uses Bayes' theorem to calculate a conditional probability and satisfies the following equations:

$$P(A \mid B) = \frac{P(A, B)}{P(B)} \quad (2)$$

$$P(A, B) = P(A \mid B)P(B) = P(B \mid A)P(A). \quad (3)$$

The above equation (2) is established by the nature of the conditional probability, and the above equation (3) is established by the rule of product.

Figure 3A:
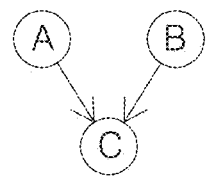
FIGS. 3A and 3B are examples showing basic characteristics for understanding the Bayesian network of the present invention.

For example, if the Bayesian network shown in FIG. 3A is constructed, A and B are independent from each other, and C is dependent on A and B. Thus, the following relationship equation (4) is established:

$$P(A,B,C)=P(C \mid A,B)P(B)P(A) \quad (4).$$

Figure 3B:

In addition, if the Bayesian network shown in FIG. 3B is constructed, C is dependent on B and B is dependent on A. Thus, the following relationship equation (5) is established by the chain rule:

$$P(A,B,C)=P(C \mid B)P(B \mid A)P(A) \quad (5).$$

The congestion map is built by building the Bayesian network between obstacle maps including environmental information of the dynamic obstacle, which is accumulated based on a basic principle as shown in FIGS. 3A and 3B, and calculating a probability of a relevant grid.

Figure 4B:
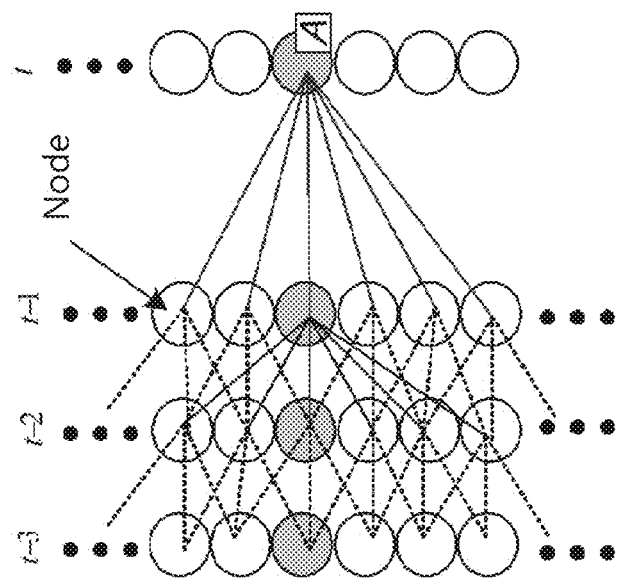
FIG. 4B is a diagram showing, as a two-dimensional Bayesian network structure, all the nodes of the FIG. 4(a)

The congestion map represents the existence or absence of an obstacle as a probability. The Bayesian network constructed using a total of n items of information accumulated during the previous times t-1, . . . , t-n is as show in FIGS. 4A and 4B. As described above, each grid on the obstacle map is represented as a single node as shown in FIGS. 4A and 4B.

Figure 4A:
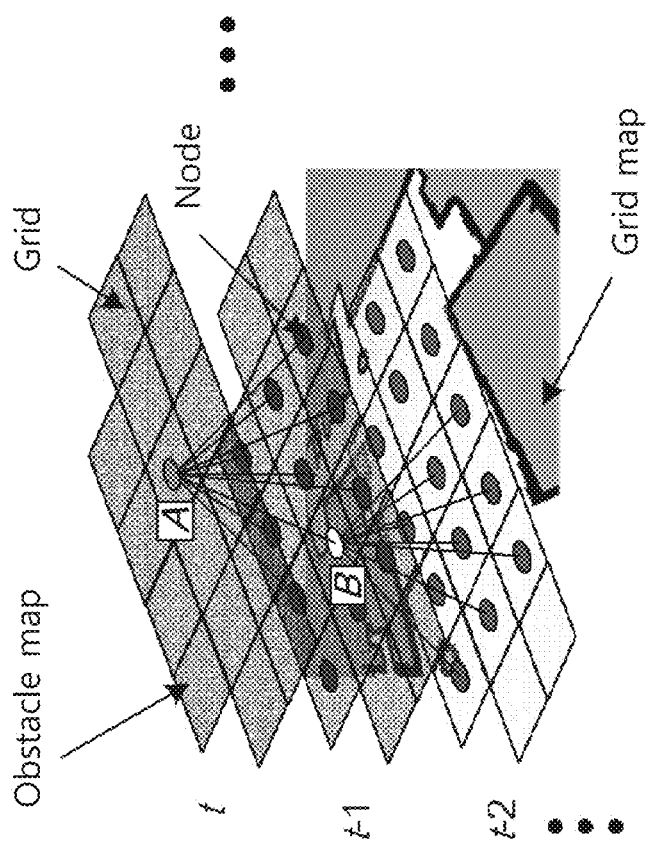
FIG. 4A is a diagram showing, as a three-dimensional Bayesian network structure, the relationship between the grid map and the obstacle map of FIG. 2 to build a congestion map of the present invention.

A green-colored node A corresponding to a relevant grid at time t in FIG. 4A can be obtained from the probabilities of peripheral grids (red-colored nodes connected to the green-colored nod A by solid lines among red-colored nodes) at previous time t-1, and the red-colored nodes at time t-1 can be obtained from the probability of blue-colored grids at time t-2. For example, A white-colored node B, one of the peripheral grids (red-colored nodes connected to the green-colored nod A by solid lines among the red-colored nodes) at previous time t-1, which influence the probability of the green-colored node A corresponding to the relevant grid at time t, can be obtained from the probabilities of peripheral grids (blue-colored nodes connected to the white-colored nod B by solid lines among the blue-colored nodes) at previous time t-2. As such, all the nodes have a relationship with nodes at previous times. The construction of the Bayesian network between the nodes can be represented as shown FIG. 4B.

A node at previous time, which influences a relevant node at time of interest, is set as a node of an adjacent region of the relevant node. The influence range of such an influence node (grid) may be extended depending on design specifications, but the influence node (grid) was set as a directly adjacent node (grid) of the relevant node (grid) in this embodiment.

Figure 5:
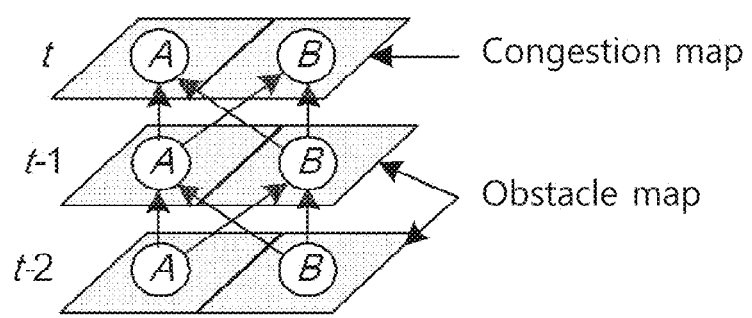
FIG. 5 is a diagram showing the formation of a Bayesian network between nodes according to the lapse of time when only two nodes exist in the obstacle map.

In FIG. 5, there is shown a simpler example for understanding the Bayesian network used in FIG. 4. In FIG. 5, the case where an obstacle map is composed of a total of two grids, i.e., a total of two nodes will be described as an example. A node corresponding to each grid is related to nodes at previous times, and there are a total of two obstacle maps accumulated, including an obstacle map at time t-2 and an obstacle map at time t-1.

A probability that a node will exist in a congestion map at current time t is calculated using two obstacle maps. As one example, a probability of existence of a node B of nodes A and B in the congestion map is first calculated. A probability of existence of a node in the obstacle maps at each time is as shown in FIG. 6.

FIG. 7 is a table showing the calculated probabilities of existence of an obstacle at time t-1 when an obstacle exists at time t-2 based on FIG. 6. The correlation of nodes between times of FIG. 7 is represented by P ($B_{t-1} \mid A_{t-2}, B_{t-2}$). In FIG. 7, 0 represents a probability that an obstacle will not exist in a relevant node and 1 represents a probability that an obstacle will exist in the relevant node. For example, a probability that an obstacle will exist in a node A at time t-2 is $2/10$ as can be seen based on information of FIG. 6. On the contrary, a probability that no obstacle will exist in a node A at time t-2 is 8/10 as can be seen based on information of FIG. 6. As such, a probability that an obstacle will exist in a node B at time t-2 is 7/10 and a probability that no obstacle will exist in a node B at time t-2 is 3/10. The following equation (6) is one of examples of equations by which P ($B_{t-1}|A_{t-2}$, $B_{t-2}$) is calculated. The calculation result of the equation (6) denotes a probability where no obstacle will exist in nodes at time t-1 when no obstacle exists in the nodes A and B at time t-2.

As another example, the following equations (7), (8) and (9) are established. FIG. 7 shows the calculation of the correlation of nodes according to all the case of the existence or absence of an obstacle.

$$P(B_{t-1}=0 \mid A_{t-2}=0, B_{t-2}=0) = \tag{6}$$

$$\frac{\frac{8}{10} \times \frac{4}{10} + \frac{3}{10} \times \frac{4}{10}}{\frac{8}{10} \times \frac{4}{10} + \frac{3}{10} \times \frac{4}{10} + \frac{8}{10} \times \frac{6}{10} + \frac{3}{10} \times \frac{6}{10}} = \frac{\frac{44}{100}}{\frac{44}{100} + \frac{66}{100}} = \frac{2}{5}$$

$$P(B_{t-1}=1 \mid A_{t-2}=0, B_{t-2}=1) = \tag{7}$$

$$\frac{\frac{8}{10} \times \frac{6}{10} + \frac{3}{10} \times \frac{6}{10}}{\frac{8}{10} \times \frac{4}{10} + \frac{3}{10} \times \frac{4}{10} + \frac{8}{10} \times \frac{6}{10} + \frac{3}{10} \times \frac{6}{10}} = \frac{\frac{66}{100}}{\frac{44}{100} + \frac{66}{100}} = \frac{3}{5}$$

$$P(B_{t-1}=0 \mid A_{t-2}=0, B_{t-2}=1) = \tag{8}$$

$$\frac{\frac{8}{10} \times \frac{4}{10} + \frac{7}{10} \times \frac{4}{10}}{\frac{8}{10} \times \frac{4}{10} + \frac{7}{10} \times \frac{4}{10} + \frac{8}{10} \times \frac{6}{10} + \frac{7}{10} \times \frac{6}{10}} = \frac{\frac{6}{10}}{\frac{6}{10} + \frac{9}{10}} = \frac{2}{5}$$

$$P(B_{t-1}=1 \mid A_{t-2}=0, B_{t-2}=1) = \tag{9}$$

$$\frac{\frac{8}{10} \times \frac{6}{10} + \frac{7}{10} \times \frac{6}{10}}{\frac{8}{10} \times \frac{4}{10} + \frac{7}{10} \times \frac{4}{10} + \frac{8}{10} \times \frac{6}{10} + \frac{7}{10} \times \frac{6}{10}} = \frac{\frac{9}{10}}{\frac{6}{10} + \frac{9}{10}} = \frac{3}{5}$$

As shown in FIG. 7, when the calculation of the probabilities of the correlation of nodes between previous time and subsequent time is completed, the probabilities of the table of FIG. 7 are assumed as general probabilities between nodes according to the lapse of time, and are used in the congestion map. Based on this result, a probability that an obstacle will exist in a grid of the congestion map at current time t can be represented by the following equation (10):

$$P(B_t=1) = \sum_{A \in 0,1} \sum_{B \in 0,1} P(B_t=1 \mid B, A)P(B)P(A) \tag{10}$$

This relationship equation can be represented as follows:

$$P(B_t=1) = P(B_t=1 \mid B_{t-1}=0, A_{t-1}=0)P(B_{t-1}=0)P(A_{t-1}=0) + \tag{11}$$
$$P(B_t=1 \mid B_{t-1}=1, A_{t-1}=0)P(B_{t-1}=1)P(A_{t-1}=0) +$$
$$P(B_t=1 \mid B_{t-1}=0, A_{t-1}=1)P(B_{t-1}=0)P(A_{t-1}=1) +$$
$$P(B_t=1 \mid B_{t-1}=1, A_{t-1}=1)P(B_{t-1}=1)P(A_{t-1}=1)$$

A probability that a dynamic obstacle will exist at a node B of the congestion map is 0.624, which is calculated by the following equation (12):

$$P(B_t=1)=3/5 \times 2/5 \times 1/5 + 3/5 \times 3/5 \times 1/5 + 3/5 \times 2/5 \times 4/5 + 3/5 \times 3/5 \times 4/5 = 0.624 \tag{12}$$

In a similar manner, a probability that a dynamic obstacle will exist at a node A of the congestion map is 0.2, which is calculated by the following equation (13):

$$P(A_t=1) = \sum_{A \in 0,1} \sum_{B \in 0,1} P(A_t=1 \mid B, A)P(B)P(A) \tag{13}$$

The relationship between nodes according to the lapse of time used at this point is represented as shown FIG. 8.

A method of calculating a probability that an obstacle will exist at nodes of the congestion map is as described above with respect to a simplified example. In the present invention, a substantial congestion map in an actual environment is built. In this case, information used in the Bayesian network is extended to information including temporal information such as date and time range.

Figure 9:
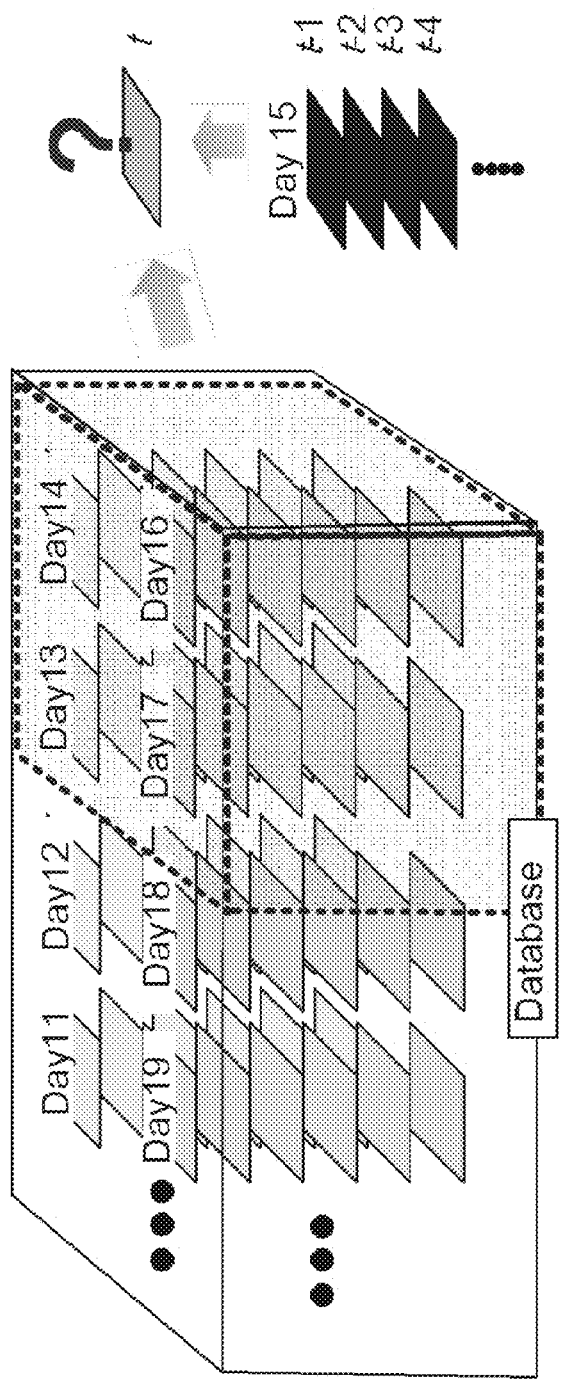
FIG. 9 is a diagram showing the selective use of information of a database to build a congestion map.
Figure 25:
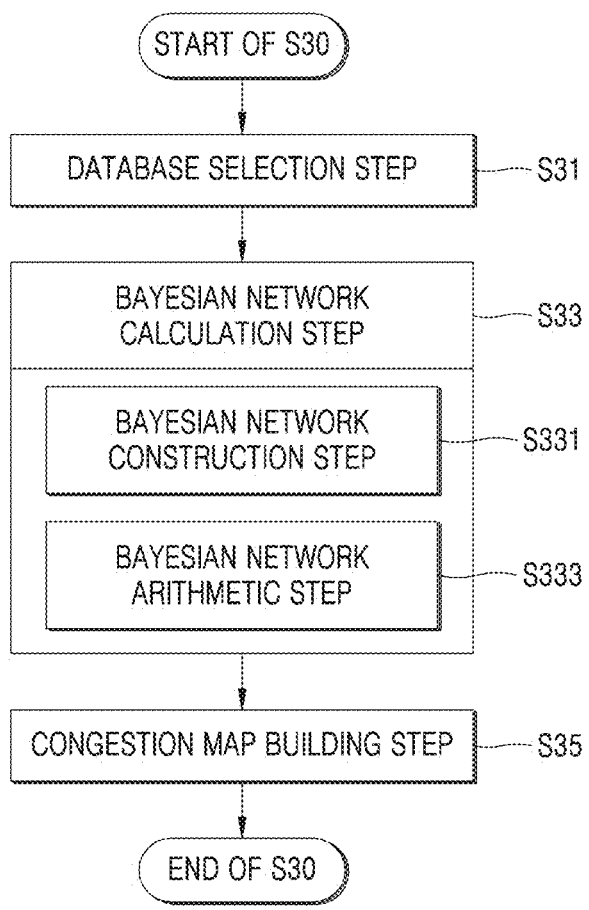

For example, when a congestion map at time t (current date is day 15 and current time is hour 2) is built, information indicated by a red dotted line in a lot of databases is selected and a selected navigation environment database is used as shown in FIG. 9 (see step S31 of FIG. 25).

A unit number of temporal information influenced by different temporal information for the same grid is obtained by using a database for nodes as many as an influence time unit number. In other words, the navigation environment database used in the present invention selects and uses a database for previous and subsequent times, previous and subsequent dates, and previous and subsequent weekdays as many as a preset number centering on a grid as an object which is to be calculated, i.e., a preset influence time unit number centering on current time, current date and current weekday as current time information of a relevant node. The detailed range of the database used in this process can be exemplified as follows. In case of date, in the case where an influence time unit number of previous and subsequent two days centering on a node as a grid of a relevant date is set, when a current date is day 15, information regarding a total of 5 nodes including 13, 14, 15, 16 and 17 is used. In case of time, in the case where an influence time unit number of previous and subsequent one hour centering on a node as a grid of a relevant time is set, when a current time is hour 2, information of hour 1, hour 2 and hour 3 centering on the current time of hour 2 is used. In calculating a probability of existence of an obstacle in a grid at an exemplified current time, hour 2 of day 15, all the information stored in each time except the above-mentioned current time, hour 2 of day 15, and information of hour 2 of day 15 uses information of previous times t-1, . . . , t-n. A diagram showing the Bayesian network built using this information is as shown in FIG. 10.

Figure 10:
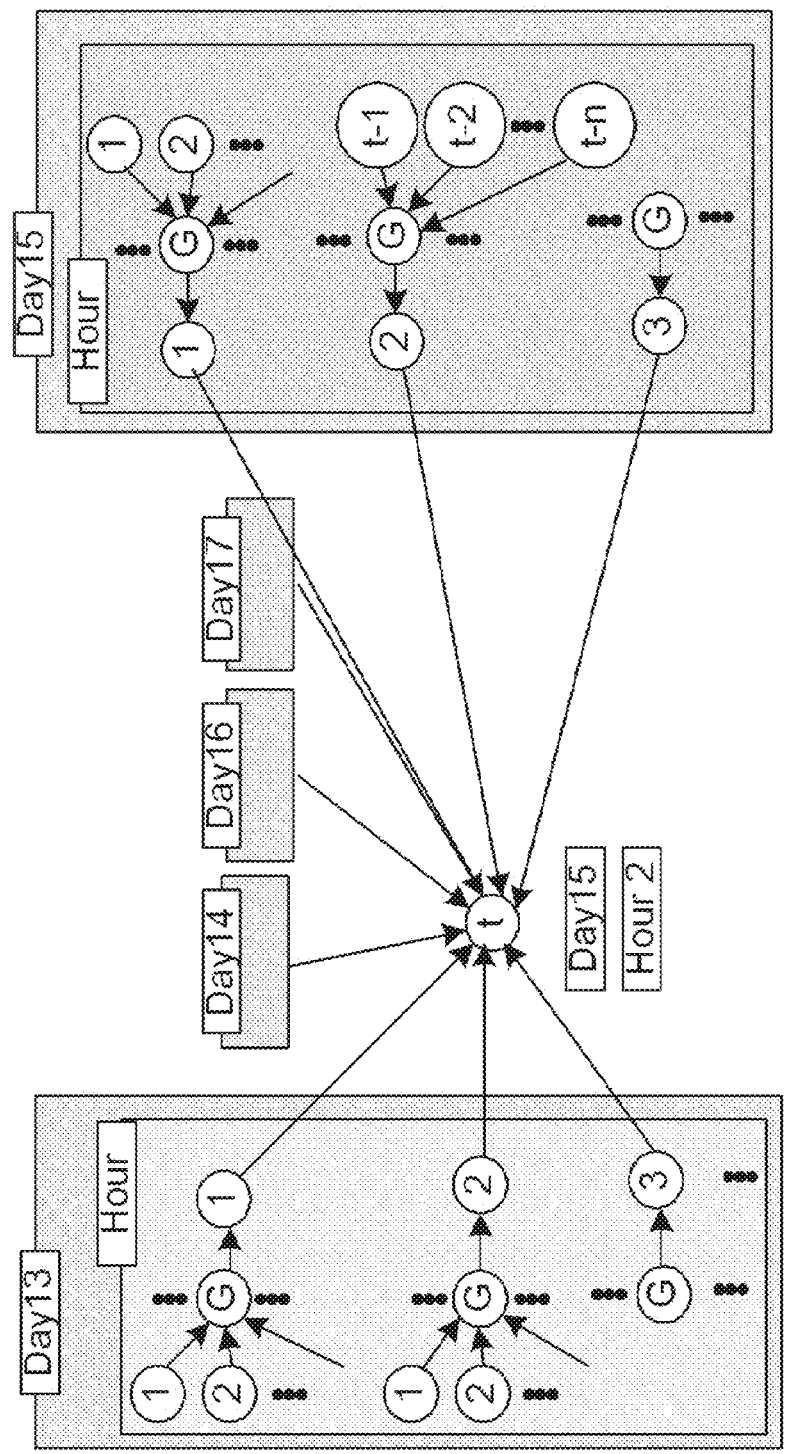
FIG. 10 is a diagram showing the construction of a Bayesian network using information of a database to build a congestion map.
Figure 11:
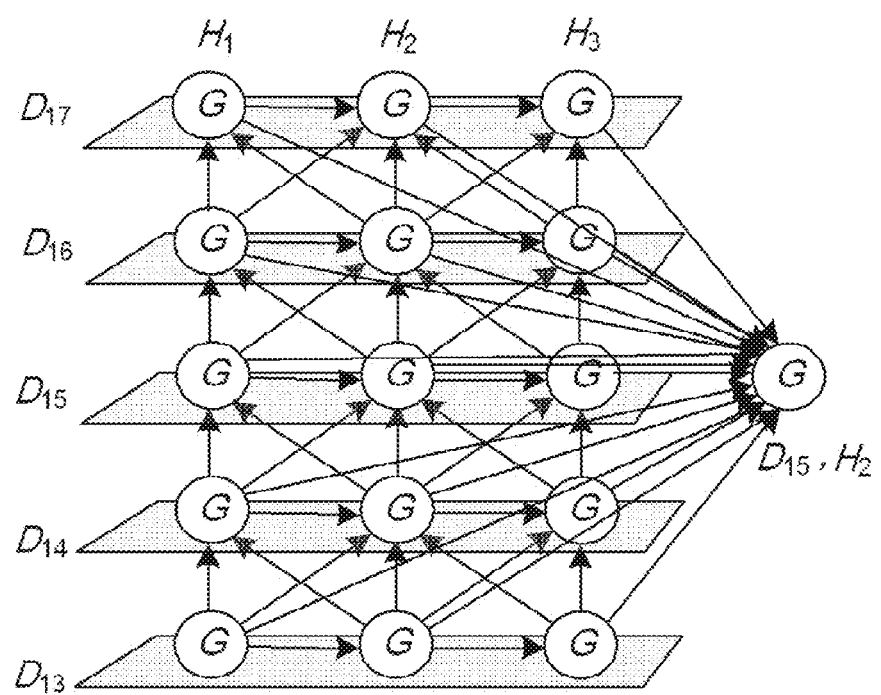
FIG. 11 is a diagram showing a Bayesian network structure more definitely indicating the relationship of FIG. 10.

In FIG. 11, the relationship of FIG. 10 is more definitely represented. Herein, G is a calculation result of the relationship between nodes of the obstacle map using the Bayesian network as shown in FIG. 4, and since this G information is individually independent information, it is indicated by a single symbol for the sake of distinction.

Figure 12:
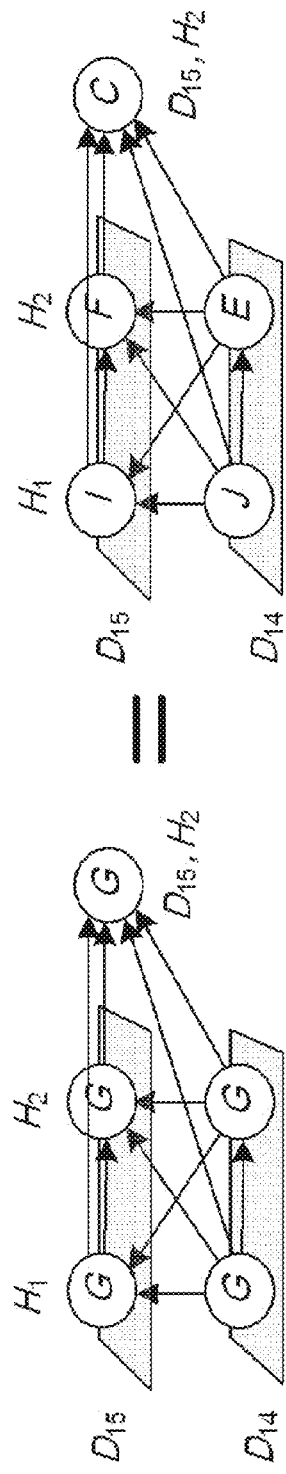
FIG. 12 is a diagram showing a Bayesian network structure constructed by considering only previous time and previous date to help the understanding of FIG. 11.

In this embodiment, an example of the limitation of the date and time of the database used to describe expressions for all the relationships between nodes to only a previous date and a previous time is described, but is not limited thereto and various selections can be made such as making a selection of weekday or space. If the current time is hour 2 of day 15, a database being used is hour 1 and hour 2 including a previous time and the date is day 14 and day 15. The Bayesian network can be constructed as shown in FIG. 12 using the above information.

$$P(C_t = 1) = \qquad (14)$$

$$\sum_{E \in 0,1} \sum_{F \in 0,1} \sum_{J \in 0,1} \sum_{I \in 0,1} P(C_t = 1 \mid E, F, I, J) P(F \mid E, J, I) P(I \mid J, E)$$

$$P(E \mid J) P(J)$$

Figure 13:
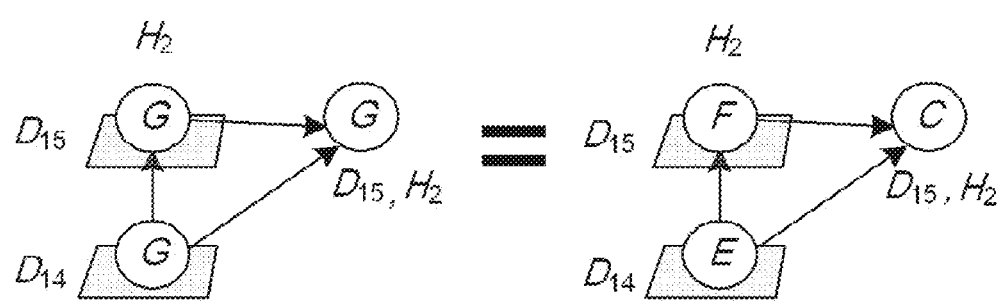
FIG. 13 is an additional diagram showing a Bayesian network structure that is basic in FIG. 12 to help the understanding of FIG. 11.

The above equation (14) is a representation of the Bayesian network of FIG. 12. Herein, a modification of variables was indicated to easily express the equation. Herein, a final node C of the congestion map is linked to nodes E, F, I, and J, and can be represented by the above equation (14) by the chain role. Herein, the reason why the construction way of the Bayesian network is different from that of a previous calculation is that a node connection line such as E→F of FIG. 12 exists. FIG. 13 is a separate diagram showing only the content of E→F of FIG. 12 to help the understanding of FIG. 11. The diagram of FIG. 13 is represented by the following equation (15). A dependent term exists in this equation, and thus a term was changed to P(F|E) unlike the above equation (9). The development of this equation (15) is represented by the following equation (16). The calculation of this equation can be extended to build the congestion map of FIG. 11.

$$P(C_t = 1) = \sum_{F \in 0,1} \sum_{E \in 0,1} P(C_t = 1 \mid E, F) P(F \mid E) P(E) \qquad (15)$$

$$\begin{aligned}P(C_t = 1) = &\ P(C_t = 1 \mid D = 0, E = 0) P(D = 0 \mid E = 0) P(E = 0) + \\ &\ P(C_t = 1 \mid D = 1, E = 0) P(D = 1 \mid E = 0) P(E = 0) + \\ &\ P(C_t = 1 \mid D = 0, E = 1) P(D = 0 \mid E = 1) P(E = 1) + \\ &\ P(C_t = 1 \mid D = 1, E = 1) P(D = 1 \mid E = 1) P(E = 1)\end{aligned} \qquad (16)$$

By virtue of the above simple examples, a method of determining the selection range of a database according to date and time of the congestion map, and a method of constructing and calculating the Bayesian network using the database have been discussed.

Figure 14:
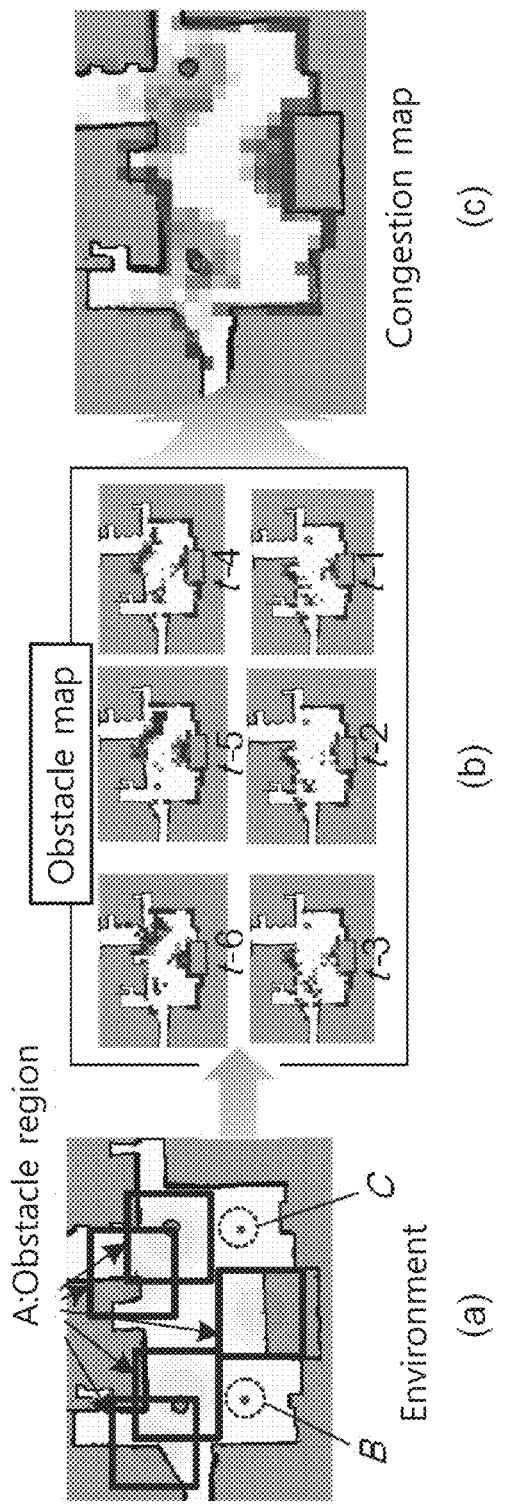
FIG. 14 is diagrams showing an actual environment where an obstacle exists, an obstacle map built in the environment of (a), and a congestion map built using the obstacle map of (b), respectively.
Figure 15:
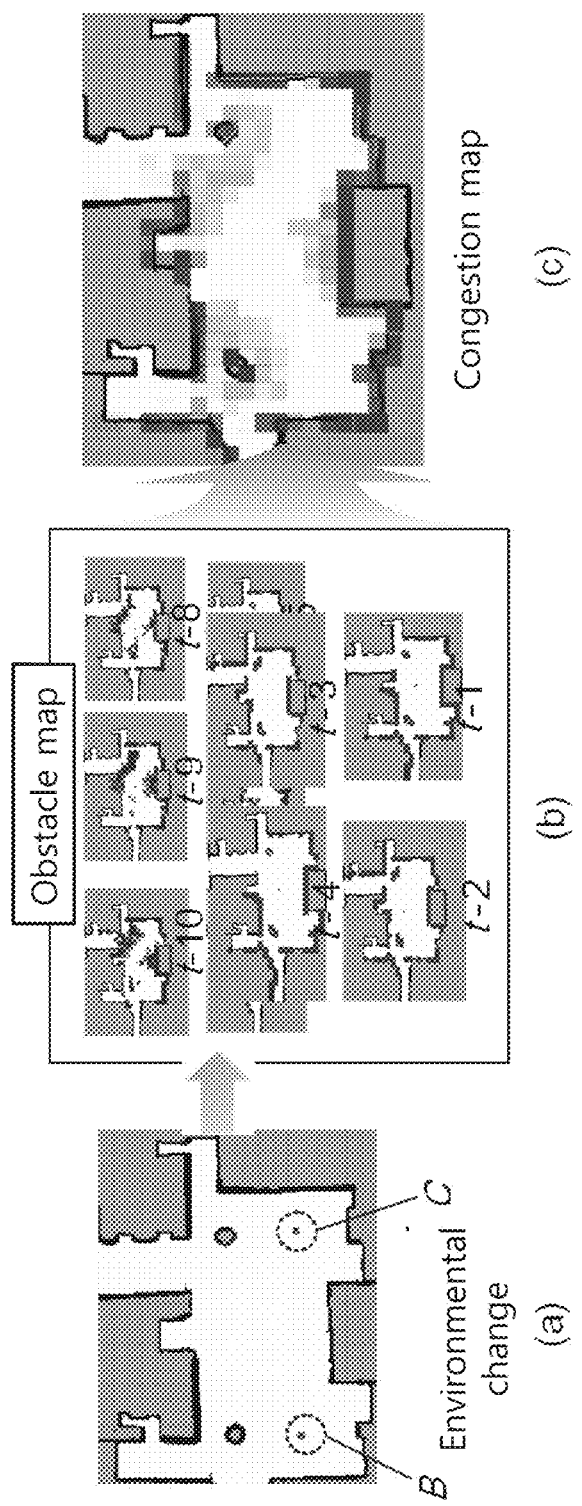
FIG. 15 is diagrams showing an actual environment where an obstacle does not exist, an obstacle map built in the environment of (a), and a congestion map built using the obstacle map of (b), respectively.

The application of this method to an actual environment is as shown in FIGS. 14 and 15. A current environment includes square regions A as indicated in FIG. 14(a) where a plurality of obstacles moves. A robot builds an obstacle map as shown in FIG. 14(b) in a process in which the robot moves while reciprocating between specific points (B and C). The Bayesian network between the information is constructed to build the obstacle map, which is as shown in FIG. 14(c). If an obstacle disappears as shown in FIG. 15(a) in a few minutes, the obstacle map is changed as shown in FIG. 15(b) and stored. The congestion map constructed based on all the stored information is as shown in FIG. 15(c). It can be found from the comparison between FIG. 14(c) and FIG. 15(c) that a probability of the congestion map is lower than that in the previous case, and thus partial regions are displayed unclearly.

The navigation path of the mobile robot of the present invention can be planned by using the congestion map calculated as described above. This path planning process employs a path creating method through the calculation of a cost function using grid map information, congestion map information, and adjacency map information of a grid map, a congestion map including an obstacle map, and an adjacency map.

The present invention employs a gradient method. The present invention is based on a cost function used in the gradient method so that a path planning operation is performed which derives a navigation path of the mobile robot. The gradient method used in the present invention uses a concept called a navigation cost to create an optimal path from a departure point from a destination point. The navigation cost is a virtual cost spent to create a path from a departure point from a destination point, and is composed of a sum of an adjacency cost in proportional to a movement distance and an intrinsic cost assigned to a region of hindering the navigation of the robot like an obstacle. In this embodiment, a function of the congestion cost was added to configure the navigation cost.

(1) Intrinsic Cost

The intrinsic cost is a cost that indicates the characteristics of a region set in connection with an environment. An obstacle on a grid as a navigation environment, a lubricous floor, a great undulated floor, an unknown region whose information is uncertain, and the like can be considered to be typical elements. In other words, a high intrinsic cost is assigned to a cell, i.e., a grid belonging to these regions that the mobile robot desires to avoid during the navigation thereof, so that the mobile robot can avoid the regions in an actual path planning operation.

As shown in FIG. 16(a), a less cost is assigned to a grid that is farther away from an obstacle. For example, regions that are nearest to the obstacle are assigned with 100, and regions that are farther away from the obstacle is assigned with 10. FIG. 16(b) is a diagram showing assignment of the intrinsic cost to the entire map.

(2) Adjacency Cost

The adjacency cost is a path cost that is related to the movement of the mobile robot between two points. In most cases, the path cost is assigned in proportional to a movement distance of the mobile robot. In other words, when a destination point is set as one point, a cost increased in proportional to a distance from the destination point is assigned to each grid. As shown in FIG. 17(a), a cost increased for the mobile robot to move one grid is set as 1. Thus, the cost spent for the mobile robot to move from a point A to a point B is a total of 2. This cost value is an adjacency cost. FIG. 17(b) a diagram showing an adjacency cost from a destination point to a robot's position.

(3) Congestion Cost

The congestion cost is a cost that is assigned to a region which is expected to be crowded with obstacles, and is calculated using the congestion map. This cost is set such that a higher cost is assigned to a region which is expected for an obstacle to exist. The reason for this is that the mobile robot consumes more energy in passing through an obstacle prediction region similarly to the case where the mobile robot walks among people in the public spaces such as the subways where a lot of people exist. Therefore, this method enables the mobile robot to pass through the obstacle prediction region, if necessary, but helps the robot to approach a desired place by detouring maximally. As can be seen from FIG. 18, the congestion cost is a result of conversion of a congestion map having a probability into a constant rate to calculate the congestion map as a cost in the form of an integer value. FIG. 19(a) shows a congestion map built in an environment. FIG. 19(b) is an example of the representation of a congestion cost into which the congestion map is converted. In this example, each congestion cost was equally assigned with 9. It can be found that an obstacle prediction region is assigned with a higher congestion cost than other regions.

Figure 18:
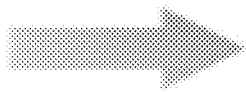
FIG. 18 is a diagram showing conversion of a congestion map into a congestion cost.

In another embodiment, the randomized information of the congestion map may be reflected with a weight for arithmetic combination of other costs, i.e., the intrinsic cost, the adjacency cost and the like. In other words, FIG. 18 shows a diagram of the calculation relationship of the congestion cost from congestion map information. When it is assumed that a probability of existence of an obstacle in each grid on the congestion map as congestion map information calculated from the above-described method has a value of from 0.5 to 0.9, the cost $C(p_i)$ of the congestion map can be represented and calculated depending on a weight variable w by the following equation (1), and the congestion cost can be calculated through this relationship equation. In the equation (1), $p_i$ denotes an $i^{th}$ grid, $P_G(p_i)$ denotes a probability of an $i^{th}$ grid of the congestion map, $P_{min}$ denotes a minimum probability of the congestion map, $P_{max}$ denotes a maximum probability of the congestion map, and w denotes a weight variable. FIG. 18 shows conversion of a congestion map into a congestion cost. Although it was assumed that the weight variable w as used herein is 8, this is an example and various values may be selected as the weight variable depending on design environments.

$$C(p_i) = (P_G(p_i) - P_{min}) * \frac{w}{(P_{max} - P_{min})} + 1 \quad (1)$$

Using a total of three cost values as defined above, the navigation cost from a departure point to a destination point of the mobile robot can be calculated, and a navigation path of the mobile robot can be created and selected based on the calculated navigation cost as described below.

(4) Creation of Path Using Navigation Cost

Figure 20:
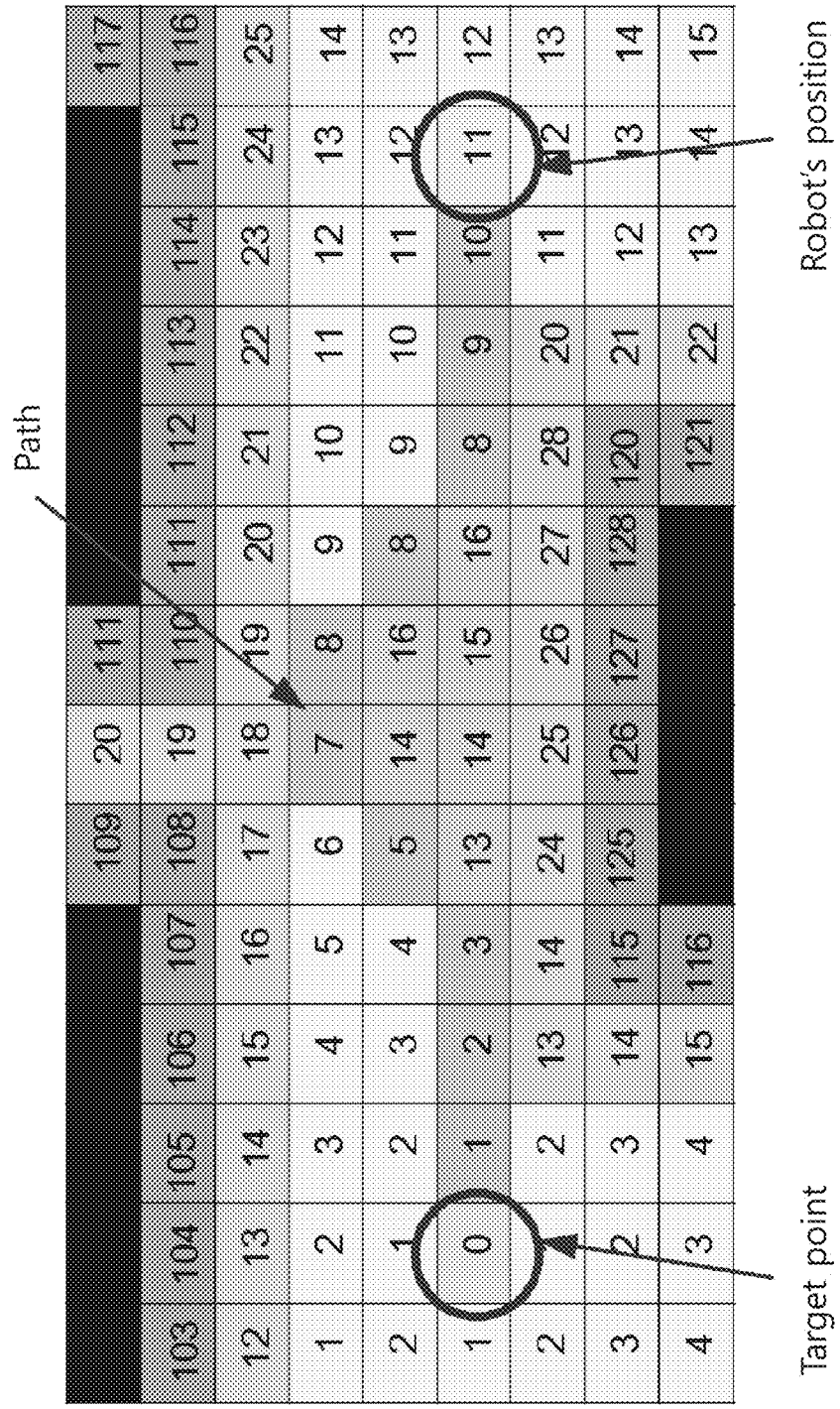
FIG. 20 is a diagram showing a navigation cost and path creation.

In a general gradient method, the navigation cost is limited to a sum of the intrinsic cost and the adjacency cost, but the navigation cost in the present invention is composed of a sum of the intrinsic cost, the adjacency cost, and the congestion cost. FIG. 20 shows a navigation cost for every grid. A path along which the mobile robot moves from a departure point to a destination point is created based on the calculated navigation cost. By virtue of this method, the path of the mobile robot is created in a direction where the navigation cost is decreased the most rapidly. As shown in FIG. 20, the path is selected as a grid whose navigation cost is minimum after comparing ambient navigation costs by starting from a robot's position. Therefore, a grid whose navigation cost is 11 is selected. When the mobile robot is caused to move based on the navigation cost, the path created from a departure point to a destination point becomes an optimal path whose navigation cost is minimum.

In the calculation process of the navigation cost of the present invention, the calculation of a navigation cost function is performed as follows. In other words, when a path to the destination point is defined as P, P is composed of a set of path points of the map, which enable the navigation of the mobile robot. Herein, $p_i$ denotes a path point on the path, and N denotes the number of all the path points on the path including the departure point and the destination point. A final point $p_N$ of the path points on the path corresponds to a target point, i.e., a destination.

$$P=\{p_1,p_2,p_3,\ldots,p_N\}$$

The concept of the navigation cost is used in a method of determining a navigation path from the robot's current position to the target point. The navigation cost is used to select a path having a minimum cost among a plurality of paths that exists from the departure point to the target point. A navigation cost Navi(P) of the path P can be represented as follows:

$$Navi(P) = \sum_i^N I(p_i) + \sum_i^N A(p_i, p_{i+1}) + \sum_i^N C(p_i) \quad (2)$$

wherein $I(p_i)$ denotes an intrinsic cost at a point $p_i$, $A(p_i, p_{i+1})$ denotes an adjacency cost for the movement of the robot from the point $p_i$ to a point and $C(p_i)$ denotes a congestion cost at the point $p_i$. As shown in FIG. 20, a navigation path from a starting point to a target point can exist in plural numbers, and thus it is necessary to select a path having a minimum cost among the plural paths.

The detailed steps of a method of controlling the navigation of the mobile robot will be described hereinafter with reference to the detailed description as described above and the accompanying drawings.

Figure 22:
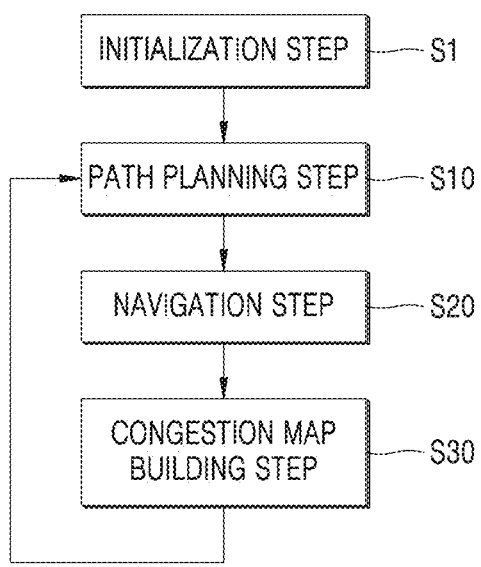
FIGS. 22 to 25 are flow charts showing a process of controlling a mobile robot of the present invention.
Figure 23:
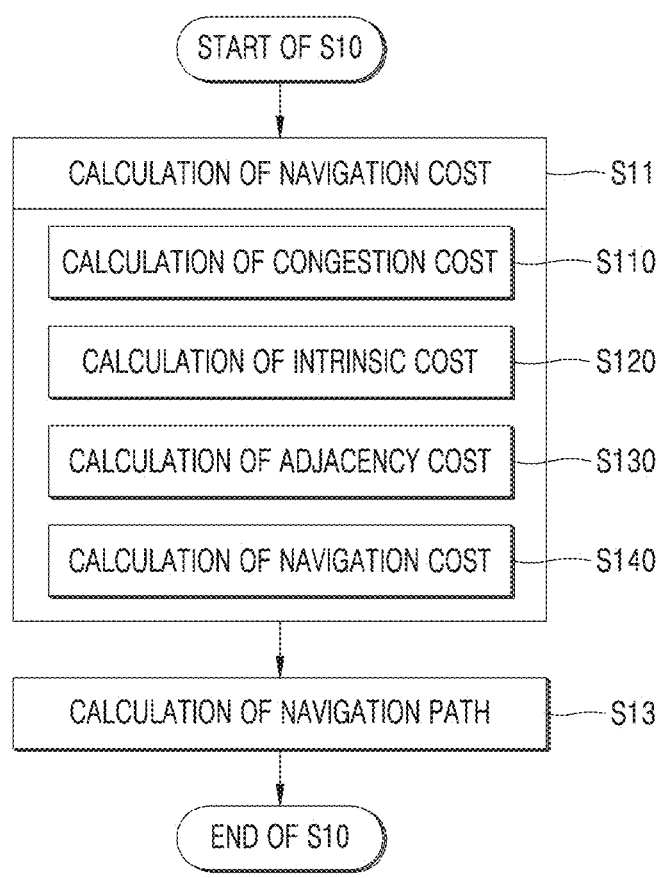
Figure 24:
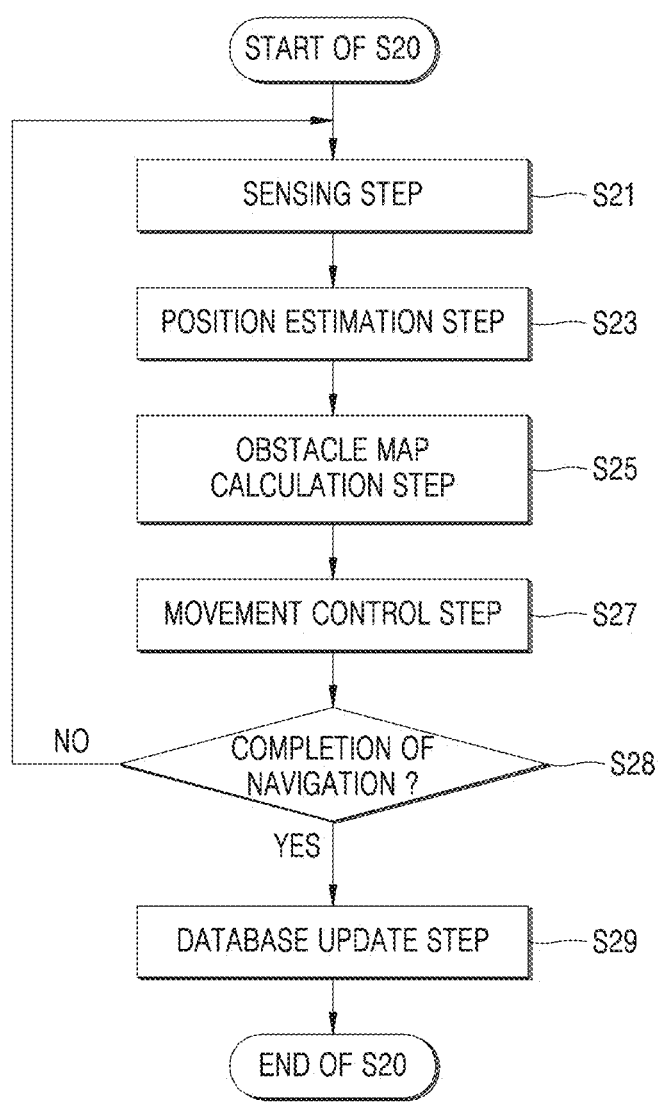

FIG. 22 is a flow chart showing a process of controlling a mobile robot according to an embodiment of the present invention, and FIGS. 23 to 25 show more detailed flow charts for FIG. 22.

A schematic control process of a method of controlling the navigation of a mobile robot of the present invention is as follows. The method of controlling the navigation of a mobile robot of the present invention includes a path planning step S10, a navigation step S20, and a congestion map building and calculating step S30, and a repetitive operation can be performed.

The control method of the present invention may further include, before the path planning step S10, an initialization step S1 for the input of an input value by the input unit 50 or preset data as an initial value, if necessary.

First, in the path planning step S10, the control unit 20 calculates a navigation path of the mobile robot from a departure point to a destination point based on congestion map information calculated using grid map information for a navigation environment included in preset data stored in the storage unit 30 or inputted through the input unit 50 and sensing information sensed and acquired by the sensing unit 10.

Thereafter, the navigation step S20 is performed. In the navigation step S20, the control unit 20 acquires navigation environmental information including obstacle map information using the sensing information sensed by the sensing unit 10 in a process in which the mobile robot moves along the navigation path calculated in the path planning step S10, and allows the mobile robot to navigate from the departure point to the destination point by performing a position estimation operation using the acquired navigation environmental information.

Subsequently, the congestion map building and calculating step S30 is performed. In the congestion map building and calculating step S30, the control unit 20 builds a congestion map for the navigation environment using a navigation environment database having stored therein navigation cost information including information regarding a probability of existence or absence of an obstacle in a relevant grid in the navigation environmental information acquired in the navigation step after the completion of the navigation step S20.

Figure 16:
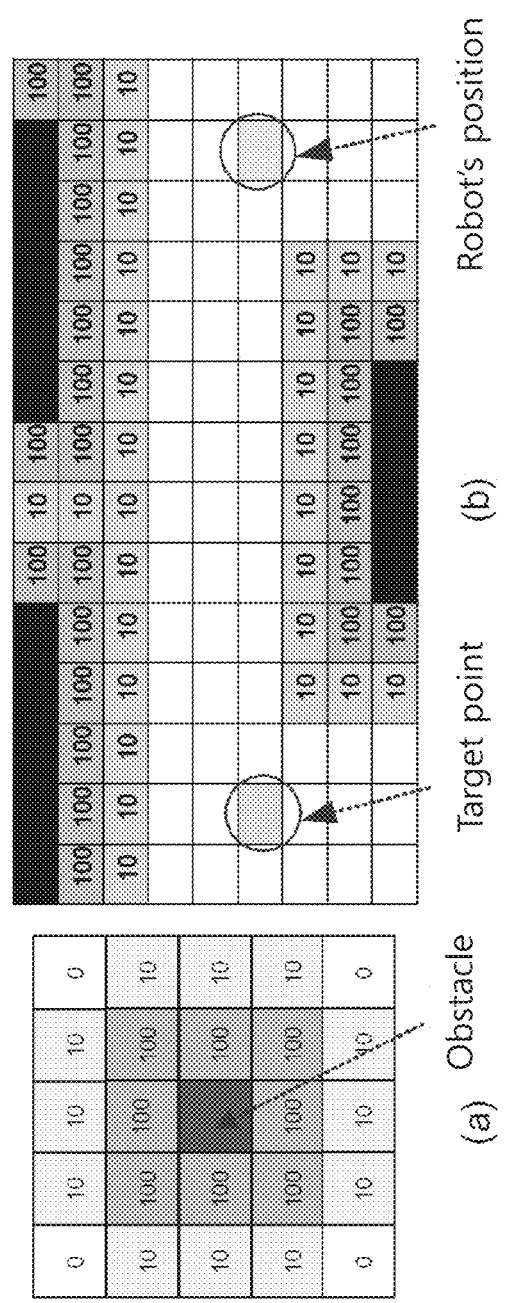
FIGS. 16 and 17 are diagrams showing an intrinsic cost and an adjacency cost, respectively.

As described above, the navigation cost information included in the navigation environment database stored in the storage unit 30 includes intrinsic cost information, congestion cost information, and adjacency cost information. The intrinsic cost information refers to cost information stored by converting information regarding a static obstacle that is fixed in position in the navigation environment with respect to each grid included in the grid information, into a cost. The intrinsic cost information is as illustrated in FIGS. 16(*a*) and 16(*b*).

Figure 19:
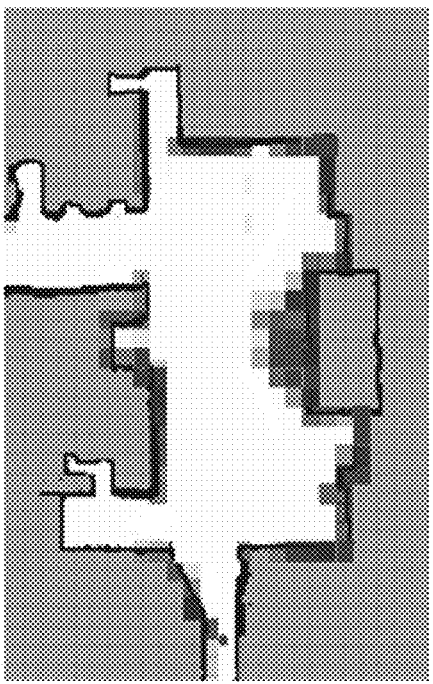
FIG. 19 is diagrams respectively showing a congestion map built in an environment, and a congestion cost into which the congestion map of (a) is converted schematically.
Figure 19:
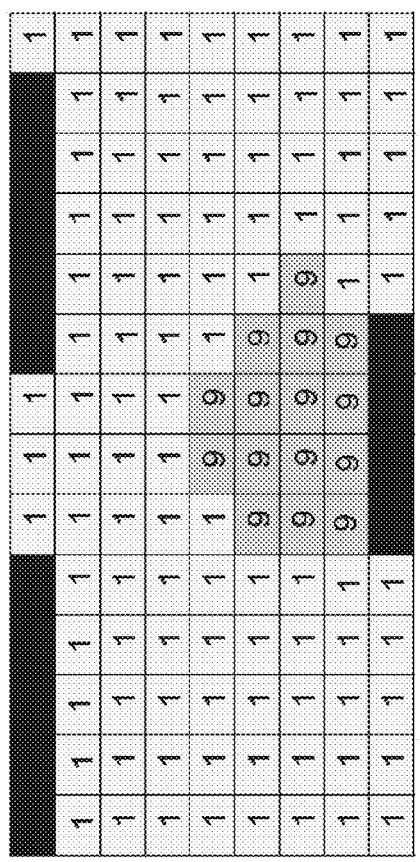

The congestion cost information refers to cost information stored by converting information regarding a dynamic obstacle that can move in the navigation environment with respect to each grid included in the grid information, i.e., an occupancy probability according to the movement of a pedestrian, into a cost. The congestion cost information is information stored by converting a congestion map as a probability diagram as shown in FIG. 19 into a congestion cost in the form of an integer value.

Figure 17:
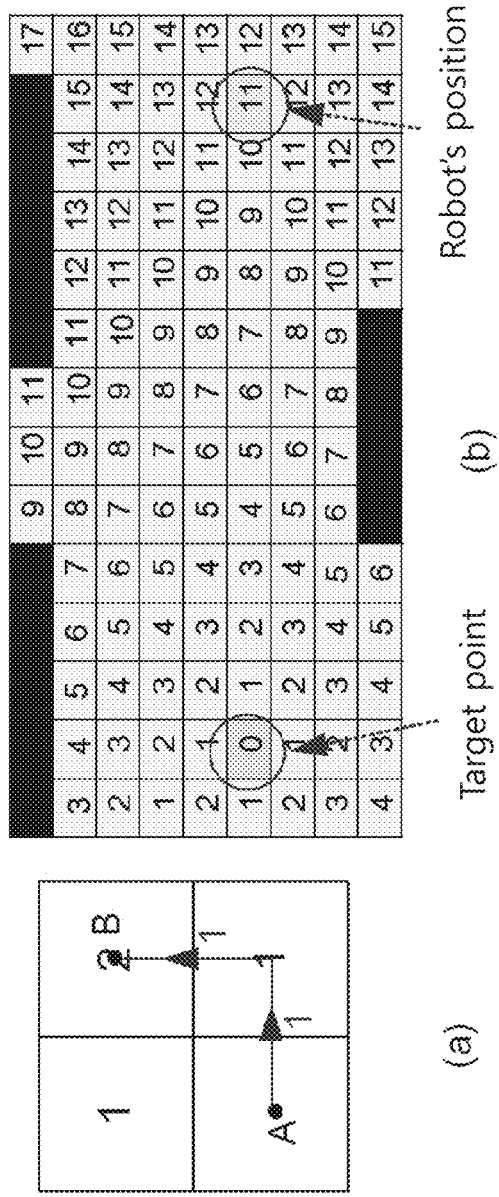

The adjacency cost information refers to cost information stored by assigning an adjacency cost to the number of grids on a minimum movement path from a departure point to a destination point if the departure point and the destination point are set. The adjacency cost information is as illustrated in FIGS. 17(*a*) and 17(*b*).

More specifically, the path planning step S10 includes a navigation cost calculation step S11 and a navigation path calculation step S13

In the navigation cost calculation step S11, the arithmetic unit 40 performs an arithmetic operation on the navigation cost information from the departure point to the destination point in response to an arithmetic control signal from the control unit 20 to calculate a navigation cost.

In addition, in the navigation path calculation step S13, the control unit 20 calculates a navigation path from the departure point to the destination point using a path calculation method in which the navigation cost calculated in the navigation cost calculation step S11 is previously set and stored.

First, the calculation of the navigation cost in the navigation cost calculation step S11 is performed through a Bayesian network. In other words, the navigation cost calculation step S11 includes a step of calculating a congestion cost constituting one of the navigation costs. The congestion cost of the present invention is calculated from a Bayesian network employing Bayes' theorem based on the navigation environment database including information stored by time with respect to each grid.

The navigation environment database includes the obstacle map information including information regarding a probability of existence or absence of an obstacle in the grid according to temporal information. In other words, as described above, a time-dependent database for a grid, i.e., a node as mentioned above is stored with respect to a grid space as each space in the grid map on the navigation environment. Each temporal information-dependent node includes the existence or absence of an obstacle in the grid according to the temporal information.

The temporal information includes information regarding date and time as exemplified above, and may further include information regarding weekday, if necessary.

A unit number of the temporal information influenced by different temporal information with respect to the same position in the Bayesian network, i.e., the same grid on the navigation environment is set as an influence time unit number, and the preset data includes the influence time unit number.

In other words, as exemplified above, the unit number of the temporal information influenced by different temporal information is used as the influence time unit number used to calculate an occupancy probability of an obstacle in a current grid at a current relevant time and date of previous and subsequent two days and two hours centering on hour 2 of day 15. As the number of the influence time unit numbers is increased, more precise probability calculation can be made, but the influence time unit number may be selected to secure rapidity and reliability through the selection of an appropriate value in that there is a limitation in the derivation of a rapid arithmetic operation due to an increase in an arithmetic load.

Meanwhile, the navigation cost calculation step S11 of the present invention includes a congestion cost calculation step S110, an intrinsic cost calculation step S120, an adjacency cost calculation step S130, and a navigation cost calculation step S140 as described above.

In the congestion cost calculation step S110, the control unit 20 calculates a congestion cost using the congestion cost information for the grid, which is calculated through the Bayesian network according to the influence time unit number. As described above, a current occupancy probability is calculated using an occupancy probability for the same grid at previous and subsequent times and dates ahead of as many as an influence time unit number with respect to a current time and a current date in a current grid where the mobile robot is currently positioned. An actual congestion cost can be calculated in the form of an integer value from the congestion cost information through the arithmetic process as in the above equation (1).

In addition, in the intrinsic cost calculation step S120, the control unit 20 calculates an intrinsic cost using the intrinsic cost information for each grid included in the grid information, which is as described above.

Thereafter, in the adjacency cost calculation step S130, the control unit 20 calculates a value according to a degree of adjacency through the number of grids on the grid map with respect to the departure point and the destination point. In other words, the control unit 20 calculates an adjacency cost using the adjacency cost information stored by assigning an adjacency cost to the number of grids on a minimum movement path from a departure point to a destination point if the departure point and the destination point are set. As shown in FIG. 17, a lower cost is assigned as the mobile robot is nearer to a destination as a target point, and a higher cost is assigned as the mobile robot is farther away from the destination.

Subsequently, the control unit 20 performs the navigation cost calculation step S140 of calculating a final navigation cost using the above-described costs. In the navigation cost calculation step S140, the control unit 20 calculates a navigation cost using the congestion cost, the intrinsic cost and the adjacency cost, which are calculated for the grid. The arithmetic process is as described above.

In the meantime, in the navigation path calculation step S13, the control unit 20 calculates the navigation path using the path calculation method based on the navigation cost. The path calculation method according to an embodiment of the present invention is a minimum path gradient method, and calculates a navigation path from the departure point to the destination point using a path calculation method in which the navigation cost calculated in the navigation cost calculation step S11 is previously set and stored.

Herein, the path calculation method employs a gradient method. In this embodiment, the minimum path gradient method is used in which a path is created in a direction where a navigation cost calculated to create an optimal path to a target point is most rapidly decreased. In other words, as shown in FIG. 20, the control unit 20 compares navigation costs for ambient grids and selects a path using a grid whose navigation cost is minimum. When a path for moving the mobile robot is calculated based on the navigation cost, an optimal path whose navigation cost is minimum can be derived as a path from a departure point to a destination point.

As described above, in the navigation step S20, the control unit 20 acquires the navigation environmental information including obstacle map information using the sensing information sensed by the sensing unit 10 in a process in which the mobile robot moves along the navigation path calculated in the path planning step S10, and allows the mobile robot to navigate from the departure point to the destination point by performing a position estimation operation using the acquired navigation environmental information.

The navigation step S20 includes a sensing step S21, a position estimation step S23, an obstacle map calculation step S25, a movement control step S27, and a navigation completion confirmation step S28, and a navigation environment database update step S29.

First, in the sensing step S21, the control unit 20 applies a sensing control signal to the sensing unit 10 and senses and acquires sensing information for the navigation environment through the sensing unit 10. When a dynamic obstacle such as a sudden obstacle appears, an operation of avoiding a collision with the obstacle in the navigation process of the mobile robot can be performed using the information sensed in the sensing step.

In the position estimation step S23, the control unit 20 estimates the current position of the mobile robot using the sensing information and the preset data stored in the storage unit 30. This position estimation uses a feature. The position estimation itself in the present invention is not a core concept, and thus a detailed description of the position estimation method will be omitted for brevity. In the present invention, a general position estimation method can be used.

Thereafter, the obstacle map calculation step S25 is performed. In the obstacle map calculation step S25, the control unit 20 calculates and updates obstacle information for the navigation environment and calculates the obstacle map information using the current position of the mobile robot obtained in the position estimation step S23 and the sensing information. In other words, obstacle information of a pedestrian or the like, sensed through the sensing unit 10 is calculated through the obstacle map at a sensing time point and stored in the storage unit 30 so that it can be used to create the congestion map.

In the movement control step S27, the control unit 20 applies a movement control signal to the robot driving unit 63 of the mobile robot to cause the mobile robot to move to a destination point.

In the navigation completion confirmation step S28, the control unit 20 confirms whether or not the movement of the mobile robot to the destination point has been completed. If it is determined in the navigation completion confirmation step S28 that the mobile robot currently does not reach the destination point, the control flow returns to step S21 to repeatedly perform a series of steps.

On the contrary, if it is determined in the navigation completion confirmation step S28 that the mobile robot currently reaches the destination point, the control flow proceeds to step S29.

In the navigation environment database update step S29, the control unit 20 updates the navigation environment database using the obstacle map information if it is determined in the navigation completion confirmation step S28 that the navigation of the mobile robot has been completed, so that the calculation of the congestion cost from the congestion map information and the calculation of the navigation cost therefrom can be made.

Subsequently, the congestion map building and calculating step S30 is performed. The congestion map building and calculating step S30 includes a navigation environment database selection step S31, a Bayesian network calculation step S33, and a congestion map building step S35.

In the navigation environment database selection step S31, the control unit 20 selects and calculates a navigation environment selection database having information regarding a probability of existence or absence of an obstacle in the grid according to temporal information with respect to a current time and a current date from the navigation environment database using the temporal information and the influence time unit number. As described above, in an embodiment of the present invention, the temporal information uses information regarding date and time. The temporal information can be selected in various manners depending on design specifications, including the use of weekday.

Subsequently, the Bayesian network calculation step S33 is performed. In the Bayesian network calculation step S33, the control unit 20 constructs a Bayesian network and performs an arithmetic operation on the Bayesian network using the navigation environment selection database, and calculates the probability of existence or absence of an obstacle in the grid with respect to the current time and the current date.

The Bayesian network calculation step S33 includes a Bayesian network construction step S331 and a Bayesian network arithmetic step S333. In the Bayesian network construction step S331, the control unit 20 constructs the Bayesian network using the navigation environment selection database. In the Bayesian network arithmetic step S333, the arithmetic unit 40 calculates the probability of existence or absence of an obstacle in the grid with respect to the current time and the current date using the Bayesian network constructed in the Bayesian network construction step S331.

Then, the congestion map building step S35 is performed. In the congestion map building step S35, the control unit 20 builds or updates a congestion map using the probability of existence or absence of an obstacle in the grid, obtained in the Bayesian network calculation step S33, and the congestion map is converted into a congestion cost which is in turn used to calculate a navigation cost in the path planning step S10.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical sprit of the appended claims.

What is claimed is:

1. A method for controlling the navigation of the mobile robot, in which a control unit applies a drive control signal to a robot driving unit to control the navigation of the mobile robot using sensing information of a sensing unit and preset data that is stored in a storage unit and includes grid information for a navigation environment, the method comprising:

a path planning step of calculating a navigation path of the mobile robot from a departure point to a destination point based on congestion map information calculated using grid map information for a navigation environment included in the preset data and the sensing information;

a navigation step of acquiring navigation environmental information including obstacle map information using the sensing information sensed by the sensing unit in a process in which the mobile robot moves along the navigation path calculated in the path planning step, and allowing the mobile robot to navigate from the departure point to the destination point by performing a position estimation operation using the acquired navigation environmental information; and a congestion map building and calculating step of building a congestion map for the navigation environment using a navigation environment database having stored therein navigation cost information including information regarding a probability of existence or absence of an obstacle in a relevant grid in the navigation environmental information acquired in the navigation step after the completion of the navigation step, wherein the navigation cost includes information regarding a static obstacle that is in a fixed position in the navigation environment and information regarding a dynamic obstacle that is moveable in the navigation environment, and wherein building the congestion map includes calculating the probability of the presence or absence of the dynamic obstacle.

2. The method according to claim 1, wherein the navigation cost information included in the navigation environment database comprises:

intrinsic cost information stored by converting the information regarding the static obstacle into a cost;

congestion cost information stored by converting the information regarding the dynamic obstacle into a cost; and adjacency cost information stored by assigning an adjacency cost to the number of grids on a minimum movement path from the departure point to the destination point 4 based on the departure point and the destination point being set.

3. The method according to claim 2, wherein the path planning step comprises:

a navigation cost calculation step of performing an arithmetic operation on the navigation cost information from the departure point to the destination point in response to an arithmetic control signal from the control unit to calculate the navigation cost; and a navigation path calculation step of calculating the navigation path from the departure point to the destination point using a path calculation method in which the navigation cost calculated in the navigation cost calculation step is previously set and stored.

4. The method according to claim 3, wherein the navigation cost calculation step comprises calculating the navigation cost using the congestion cost information calculated from a Bayesian network employing Bayes' theorem based on the navigation environment database.

5. The method according to claim 4, wherein the navigation environment database obstacle map information including information regarding a probability of existence or absence of an obstacle in the grid according to temporal information.

6. The method according to claim 5, wherein the temporal information comprises information regarding weekday, date and time, and wherein a unit number of the temporal information influenced by different temporal information with respect to the same grid in the Bayesian network is set as an influence time unit number, and the preset data comprises the influence time unit number.

7. The method according to claim 6, wherein the navigation cost calculation step comprises:

a congestion cost calculation step of calculating a congestion cost using the congestion cost information for the grid, which is calculated through the Bayesian network according to the influence time unit number;

an intrinsic cost calculation step of calculating an intrinsic cost using the intrinsic cost information for each grid included in the grid information;

an adjacency cost calculation step of calculating an adjacency cost using the adjacency cost information stored by assigning an adjacency cost to the number of grids on a minimum movement path from a departure point to a destination point if the departure point and the destination point are set; and a navigation cost calculation step of calculating a navigation cost using the congestion cost, the intrinsic cost and the adjacency cost, which are calculated for the grid.

8. The method according to claim 7, wherein the path calculation method is a minimum path gradient method, and comprises the navigation path calculation step of calculating the navigation path formed at a minimum cost from the departure point to the destination point using a navigation cost for each grid, which is calculated in the navigation cost calculation step.

9. The method according to claim 8, wherein the navigation step comprises:

a sensing step of sensing information for the navigation environment through the sensing unit;

a position estimation step of allowing the control unit to estimate the current position of the mobile robot using the sensing information and the preset data;

an obstacle map calculation step of calculating and updating obstacle information for the navigation environment and calculating the obstacle map information using the current position of the mobile robot obtained in the position estimation step and the sensing information;

a movement control step of allowing the control unit to apply a movement control signal to a robot driving unit of the mobile robot to cause the mobile robot to move to the destination point;

a navigation completion confirmation step of confirming whether or not the mobile robot moving through the movement control step reaches the destination point; and a navigation environment database update step of updating the navigation environment database using the obstacle map information if it is determined in the navigation completion confirmation step that the navigation of the mobile robot has been completed.

10. The method according to claim 9, wherein the temporal information is information regarding date and time, and wherein the congestion map building and calculating step comprises:

a navigation environment database selection step of selecting and calculating a navigation environment selection database having information regarding a probability of existence or absence of an obstacle in the grid according to temporal information with respect to a current time and a current date from the navigation environment database using the temporal information and the influence time unit number;

a Bayesian network calculation step of constructing a Bayesian network and performing an arithmetic operation on the Bayesian network using the navigation environment selection database, and calculating the probability of existence or absence of an obstacle in the grid with respect to the current time and the current date; and a congestion map building step of building or updating a congestion map using the probability of existence or absence of an obstacle in the grid, obtained in the Bayesian network calculation step.

11. The method according to claim 9, wherein the Bayesian network calculation step comprises:

a Bayesian network construction step of constructing the Bayesian network using the navigation environment selection database; and a Bayesian network arithmetic step of calculating the probability of existence or absence of an obstacle in the grid with respect to the current time and the current date using the Bayesian network constructed in the Bayesian network construction step.

\* \* \* \* \*